(12) United States Patent
Yang et al.

(10) Patent No.: US 11,590,703 B2
(45) Date of Patent: Feb. 28, 2023

(54) INFRARED RADIATION SENSING AND BEAM CONTROL IN ELECTRON BEAM ADDITIVE MANUFACTURING

(71) Applicant: DIVERGENT TECHNOLOGIES, INC., Los Angeles, CA (US)

(72) Inventors: Eric Yang, Torrance, CA (US); Andrius Juozas Raulinaitis, Long Beach, CA (US); Michael James Hoganson, Hermosa Beach, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 284 days.

(21) Appl. No.: 16/751,821

(22) Filed: Jan. 24, 2020

(65) Prior Publication Data
US 2021/0229357 A1   Jul. 29, 2021

(51) Int. Cl.
*B29C 64/286* (2017.01)
*B29C 64/371* (2017.01)
(Continued)

(52) U.S. Cl.
CPC .......... *B29C 64/286* (2017.08); *B29C 64/255* (2017.08); *B29C 64/268* (2017.08);
(Continued)

(58) Field of Classification Search
CPC ... B29C 64/286; B29C 64/255; B29C 64/268; B29C 64/371; B29C 64/153;
(Continued)

(56) References Cited

U.S. PATENT DOCUMENTS 5,203,226 A    4/1993   Hongou et al.
5,742,385 A    4/1998   Champa
(Continued)

FOREIGN PATENT DOCUMENTS

WO    1996036455 A1   11/1996
WO    1996036525 A1   11/1996
(Continued)

OTHER PUBLICATIONS

US 9,202,136 B2, 12/2015, Schmidt et al. (withdrawn)
US 9,809,265 B2, 11/2017, Kinjo (withdrawn)
US 10,449,880 B2, 10/2019, Mizobata et al. (withdrawn)

*Primary Examiner* — Michael J Brown
(74) *Attorney, Agent, or Firm* — ArentFox Schiff LLP

(57) ABSTRACT

Apparatuses for dynamically sensing infrared (IR) radiation in an electron beam powder bed fusion (EB-PBF) printer are provided. A radiation collector receives radiation from a surface of the powder bed. An IR-transparent material rejects one or more non-IR wavelengths, and a lens focuses the IR radiation onto an optical fiber. The IR radiation is carried from the vacuum chamber of the printer to a sensor, where IR information is determined based on the received IR radiation. The IR information may be received from the sensor and used by the print controller to modify one or more parameters, such as beam intensity or scanning rate, on the fly or during the next print cycle. An occlusion member can be used to selectively block or expose the radiation collector to protect the radiation collector from condensation of vapor from vaporization of particles at high temperatures.

32 Claims, 13 Drawing Sheets

(51) Int. Cl.
   *B29C 64/268* (2017.01)
   *B29C 64/255* (2017.01)
   *B22F 10/28* (2021.01)
   *B33Y 40/00* (2020.01)
   *B29C 64/153* (2017.01)
   *B33Y 30/00* (2015.01)

(52) U.S. Cl.
   CPC .......... *B29C 64/371* (2017.08); *B29C 64/153* (2017.08); *B33Y 30/00* (2014.12); *B33Y 40/00* (2014.12)

(58) Field of Classification Search
   CPC ......... B33Y 30/00; B33Y 40/00; Y02P 10/25; B22F 10/36; B22F 12/41; B22F 10/28
   USPC ........................................................ 700/117
   See application file for complete search history.

(56) References Cited

U.S. PATENT DOCUMENTS

| | | |
|---|---|---|
| 5,990,444 A | 11/1999 | Costin |
| 6,010,155 A | 1/2000 | Rinehart |
| 6,096,249 A | 8/2000 | Yamaguchi |
| 6,140,602 A | 10/2000 | Costin |
| 6,250,533 B1 | 6/2001 | Otterbein et al. |
| 6,252,196 B1 | 6/2001 | Costin et al. |
| 6,318,642 B1 | 11/2001 | Goenka et al. |
| 6,365,057 B1 | 4/2002 | Whitehurst et al. |
| 6,391,251 B1 | 5/2002 | Keicher et al. |
| 6,409,930 B1 | 6/2002 | Whitehurst et al. |
| 6,468,439 B1 | 10/2002 | Whitehurst et al. |
| 6,554,345 B2 | 4/2003 | Jonsson |
| 6,585,151 B1 | 7/2003 | Ghosh |
| 6,644,721 B1 | 11/2003 | Miskech et al. |
| 6,811,744 B2 | 11/2004 | Keicher et al. |
| 6,866,497 B2 | 3/2005 | Saiki |
| 6,919,035 B1 | 7/2005 | Clough |
| 6,926,970 B2 | 8/2005 | James et al. |
| 7,152,292 B2 | 12/2006 | Hohmann et al. |
| 7,344,186 B1 | 3/2008 | Hausler et al. |
| 7,500,373 B2 | 3/2009 | Quell |
| 7,586,062 B2 | 9/2009 | Heberer |
| 7,637,134 B2 | 12/2009 | Burzlaff et al. |
| 7,710,347 B2 | 5/2010 | Gentilman et al. |
| 7,716,802 B2 | 5/2010 | Stern et al. |
| 7,745,293 B2 | 6/2010 | Yamazaki et al. |
| 7,766,123 B2 | 8/2010 | Sakurai et al. |
| 7,852,388 B2 | 12/2010 | Shimizu et al. |
| 7,908,922 B2 | 3/2011 | Zarabadi et al. |
| 7,951,324 B2 | 5/2011 | Naruse et al. |
| 8,094,036 B2 | 1/2012 | Heberer |
| 8,163,077 B2 | 4/2012 | Eron et al. |
| 8,286,236 B2 | 10/2012 | Jung et al. |
| 8,289,352 B2 | 10/2012 | Vartanian et al. |
| 8,297,096 B2 | 10/2012 | Mizumura et al. |
| 8,354,170 B1 | 1/2013 | Henry et al. |
| 8,383,028 B2 | 2/2013 | Lyons |
| 8,408,036 B2 | 4/2013 | Reith et al. |
| 8,429,754 B2 | 4/2013 | Jung et al. |
| 8,437,513 B1 | 5/2013 | Derakhshani et al. |
| 8,444,903 B2 | 5/2013 | Lyons et al. |
| 8,452,073 B2 | 5/2013 | Taminger et al. |
| 8,599,301 B2 | 12/2013 | Dowski, Jr. et al. |
| 8,606,540 B2 | 12/2013 | Haisty et al. |
| 8,610,761 B2 | 12/2013 | Haisty et al. |
| 8,631,996 B2 | 1/2014 | Quell et al. |
| 8,675,925 B2 | 3/2014 | Derakhshani et al. |
| 8,678,060 B2 | 3/2014 | Dietz et al. |
| 8,686,314 B2 | 4/2014 | Schneegans et al. |
| 8,686,997 B2 | 4/2014 | Radet et al. |
| 8,694,284 B2 | 4/2014 | Berard |
| 8,720,876 B2 | 5/2014 | Reith et al. |
| 8,752,166 B2 | 6/2014 | Jung et al. |
| 8,755,923 B2 | 6/2014 | Farahani et al. |
| 8,787,628 B1 | 7/2014 | Derakhshani et al. |
| 8,818,771 B2 | 8/2014 | Gielis et al. |
| 8,873,238 B2 | 10/2014 | Wilkins |
| 8,978,535 B2 | 3/2015 | Ortiz et al. |
| 9,006,605 B2 | 4/2015 | Schneegans et al. |
| 9,071,436 B2 | 6/2015 | Jung et al. |
| 9,101,979 B2 | 8/2015 | Hofmann et al. |
| 9,104,921 B2 | 8/2015 | Derakhshani et al. |
| 9,126,365 B1 | 9/2015 | Mark et al. |
| 9,128,476 B2 | 9/2015 | Jung et al. |
| 9,138,924 B2 | 9/2015 | Yen |
| 9,149,988 B2 | 10/2015 | Mark et al. |
| 9,156,205 B2 | 10/2015 | Mark et al. |
| 9,186,848 B2 | 11/2015 | Mark et al. |
| 9,244,986 B2 | 1/2016 | Karmarkar |
| 9,248,611 B2 | 2/2016 | Divine et al. |
| 9,254,535 B2 | 2/2016 | Buller et al. |
| 9,266,566 B2 | 2/2016 | Kim |
| 9,269,022 B2 | 2/2016 | Rhoads et al. |
| 9,327,452 B2 | 5/2016 | Mark et al. |
| 9,329,020 B1 | 5/2016 | Napoletano |
| 9,332,251 B2 | 5/2016 | Haisty et al. |
| 9,346,127 B2 | 5/2016 | Buller et al. |
| 9,389,315 B2 | 7/2016 | Bruder et al. |
| 9,399,256 B2 | 7/2016 | Buller et al. |
| 9,403,235 B2 | 8/2016 | Buller et al. |
| 9,418,193 B2 | 8/2016 | Dowski, Jr. et al. |
| 9,457,514 B2 | 10/2016 | Schwärzler |
| 9,469,057 B2 | 10/2016 | Johnson et al. |
| 9,478,063 B2 | 10/2016 | Rhoads et al. |
| 9,481,402 B1 | 11/2016 | Muto et al. |
| 9,486,878 B2 | 11/2016 | Buller et al. |
| 9,486,960 B2 | 11/2016 | Paschkewitz et al. |
| 9,502,993 B2 | 11/2016 | Deng |
| 9,525,262 B2 | 12/2016 | Stuart et al. |
| 9,533,526 B1 | 1/2017 | Nevins |
| 9,555,315 B2 | 1/2017 | Aders |
| 9,555,580 B1 | 1/2017 | Dykstra et al. |
| 9,557,856 B2 | 1/2017 | Send et al. |
| 9,566,742 B2 | 2/2017 | Keating et al. |
| 9,566,758 B2 | 2/2017 | Cheung et al. |
| 9,573,193 B2 | 2/2017 | Buller et al. |
| 9,573,225 B2 | 2/2017 | Buller et al. |
| 9,586,290 B2 | 3/2017 | Buller et al. |
| 9,595,795 B2 | 3/2017 | Lane et al. |
| 9,597,843 B2 | 3/2017 | Stauffer et al. |
| 9,600,929 B1 | 3/2017 | Young et al. |
| 9,609,755 B2 | 3/2017 | Coull et al. |
| 9,610,737 B2 | 4/2017 | Johnson et al. |
| 9,611,667 B2 | 4/2017 | GangaRao et al. |
| 9,616,623 B2 | 4/2017 | Johnson et al. |
| 9,626,487 B2 | 4/2017 | Jung et al. |
| 9,626,489 B2 | 4/2017 | Nilsson |
| 9,643,361 B2 | 5/2017 | Liu |
| 9,662,840 B1 | 5/2017 | Buller et al. |
| 9,665,182 B2 | 5/2017 | Send et al. |
| 9,672,389 B1 | 6/2017 | Mosterman et al. |
| 9,672,550 B2 | 6/2017 | Apsley et al. |
| 9,676,145 B2 | 6/2017 | Buller et al. |
| 9,684,919 B2 | 6/2017 | Apsley et al. |
| 9,688,032 B2 | 6/2017 | Kia et al. |
| 9,690,286 B2 | 6/2017 | Hovsepian et al. |
| 9,700,966 B2 | 7/2017 | Kraft et al. |
| 9,703,896 B2 | 7/2017 | Zhang et al. |
| 9,713,903 B2 | 7/2017 | Paschkewitz et al. |
| 9,718,302 B2 | 8/2017 | Young et al. |
| 9,718,434 B2 | 8/2017 | Hector, Jr. et al. |
| 9,724,877 B2 | 8/2017 | Flitsch et al. |
| 9,724,881 B2 | 8/2017 | Johnson et al. |
| 9,725,178 B2 | 8/2017 | Wang |
| 9,731,730 B2 | 8/2017 | Stiles |
| 9,731,773 B2 | 8/2017 | Gami et al. |
| 9,741,954 B2 | 8/2017 | Bruder et al. |
| 9,747,352 B2 | 8/2017 | Karmarkar |
| 9,764,415 B2 | 9/2017 | Seufzer et al. |
| 9,764,520 B2 | 9/2017 | Johnson et al. |
| 9,765,226 B2 | 9/2017 | Dain |
| 9,770,760 B2 | 9/2017 | Liu |
| 9,773,393 B2 | 9/2017 | Velez |

(56) References Cited

U.S. PATENT DOCUMENTS

| | | |
|---|---|---|
| 9,776,234 B2 | 10/2017 | Schaafhausen et al. |
| 9,782,936 B2 | 10/2017 | Glunz et al. |
| 9,783,324 B2 | 10/2017 | Embler et al. |
| 9,783,977 B2 | 10/2017 | Alqasimi et al. |
| 9,789,548 B2 | 10/2017 | Golshany et al. |
| 9,789,922 B2 | 10/2017 | Dosenbach et al. |
| 9,796,137 B2 | 10/2017 | Zhang et al. |
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |

(56) References Cited

U.S. PATENT DOCUMENTS

| | | |
|---|---|---|
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |
| 10,337,952 B2 | 7/2019 | Bosetti et al. |
| 10,339,266 B2 | 7/2019 | Urick et al. |
| 10,343,330 B2 | 7/2019 | Evans et al. |
| 10,343,331 B2 | 7/2019 | McCall et al. |
| 10,343,355 B2 | 7/2019 | Evans et al. |
| 10,343,724 B2 | 7/2019 | Polewarczyk et al. |
| 10,343,725 B2 | 7/2019 | Martin et al. |
| 10,350,823 B2 | 7/2019 | Rolland et al. |
| 10,356,341 B2 | 7/2019 | Holzer et al. |
| 10,356,395 B2 | 7/2019 | Holzer et al. |
| 10,357,829 B2 | 7/2019 | Spink et al. |
| 10,357,957 B2 | 7/2019 | Buller et al. |
| 10,359,756 B2 | 7/2019 | Newell et al. |
| 10,369,629 B2 | 8/2019 | Mendelsberg et al. |
| 10,382,739 B1 | 8/2019 | Rusu et al. |
| 10,384,393 B2 | 8/2019 | Xu et al. |
| 10,384,416 B2 | 8/2019 | Cheung et al. |
| 10,389,410 B2 | 8/2019 | Brooks et al. |
| 10,391,710 B2 | 8/2019 | Mondesir |
| 10,392,097 B2 | 8/2019 | Pham et al. |
| 10,392,131 B2 | 8/2019 | Deck et al. |
| 10,393,315 B2 | 8/2019 | Tyan |
| 10,400,080 B2 | 9/2019 | Ramakrishnan et al. |
| 10,401,832 B2 | 9/2019 | Snyder et al. |
| 10,403,009 B2 | 9/2019 | Mariampillai et al. |
| 10,406,750 B2 | 9/2019 | Barton et al. |
| 10,412,283 B2 | 9/2019 | Send et al. |
| 10,416,095 B2 | 9/2019 | Herbsommer et al. |
| 10,421,496 B2 | 9/2019 | Swayne et al. |
| 10,421,863 B2 | 9/2019 | Hasegawa et al. |
| 10,422,478 B2 | 9/2019 | Leachman et al. |
| 10,425,793 B2 | 9/2019 | Sankaran et al. |
| 10,427,364 B2 | 10/2019 | Alves |
| 10,429,006 B2 | 10/2019 | Tyan et al. |
| 10,434,573 B2 | 10/2019 | Buller et al. |
| 10,435,185 B2 | 10/2019 | Divine et al. |
| 10,435,773 B2 | 10/2019 | Liu et al. |
| 10,436,038 B2 | 10/2019 | Buhler et al. |
| 10,438,407 B2 | 10/2019 | Pavanaskar et al. |
| 10,440,351 B2 | 10/2019 | Holzer et al. |
| 10,442,002 B2 | 10/2019 | Benthien et al. |
| 10,442,003 B2 | 10/2019 | Symeonidis et al. |
| 10,449,696 B2 | 10/2019 | Elgar et al. |
| 10,449,737 B2 | 10/2019 | Johnson et al. |
| 10,461,810 B2 | 10/2019 | Cook et al. |
| 2006/0108783 A1 | 5/2006 | Ni et al. |
| 2014/0277669 A1 | 9/2014 | Nardi et al. |
| 2017/0021455 A1* | 1/2017 | Dallarosa ............. B23K 26/342 |
| 2017/0113344 A1 | 4/2017 | Schönberg |
| 2017/0341309 A1 | 11/2017 | Piepenbrock et al. |
| 2020/0215810 A1* | 7/2020 | Sutcliffe ................ B22F 10/20 |

FOREIGN PATENT DOCUMENTS

| | | |
|---|---|---|
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2014016437 A1 | 1/2014 |
| WO | 2014187720 A1 | 11/2014 |
| WO | 2014195340 A1 | 12/2014 |
| WO | 2015193331 A1 | 12/2015 |
| WO | 2016116414 A1 | 7/2016 |
| WO | 2017036461 A1 | 3/2017 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |

* cited by examiner

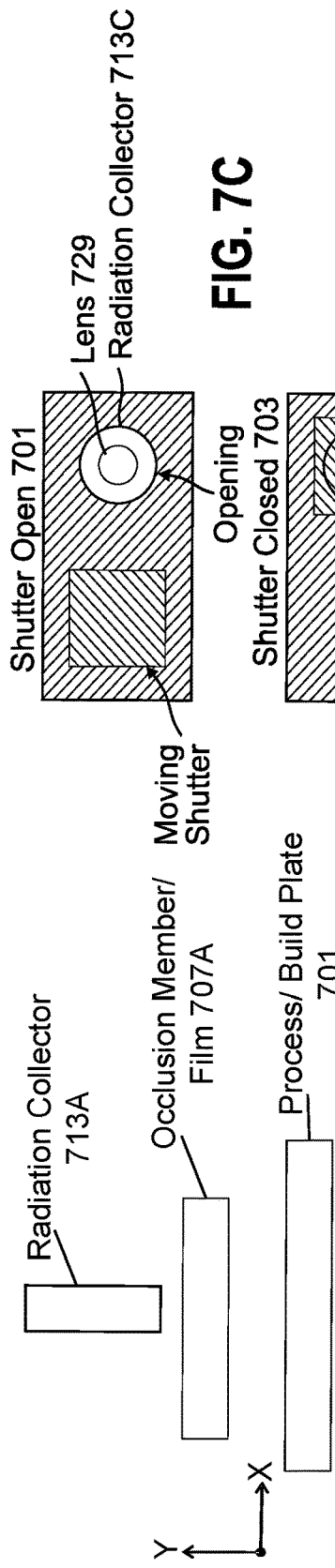
FIG. 7A
FIG. 7B
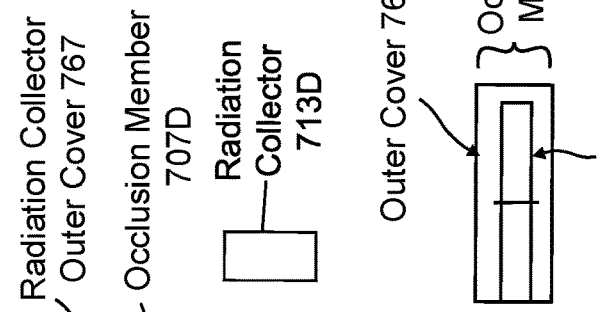
FIG. 7C
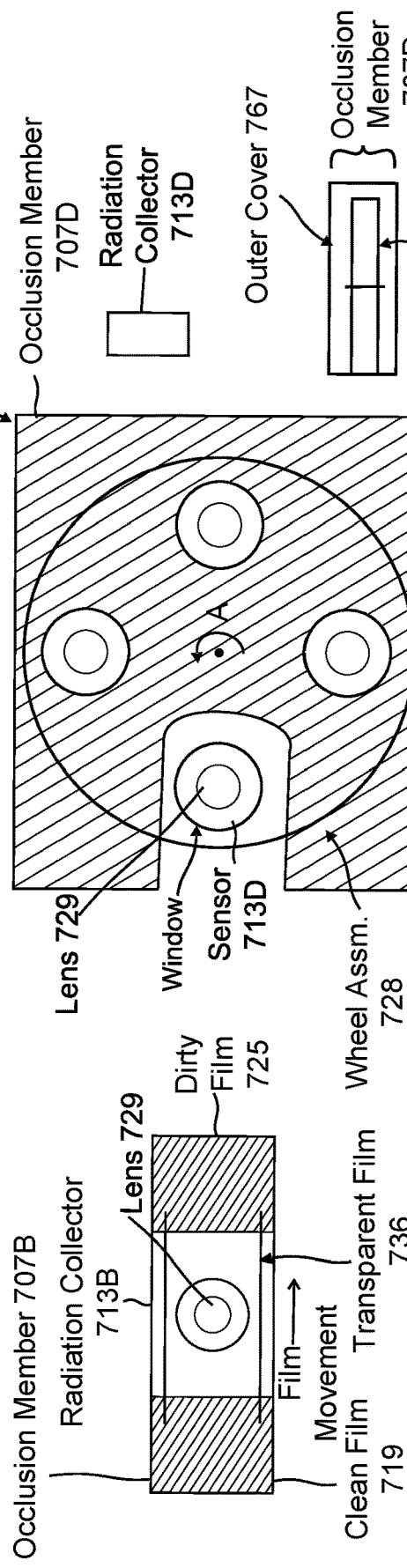
FIG. 7D

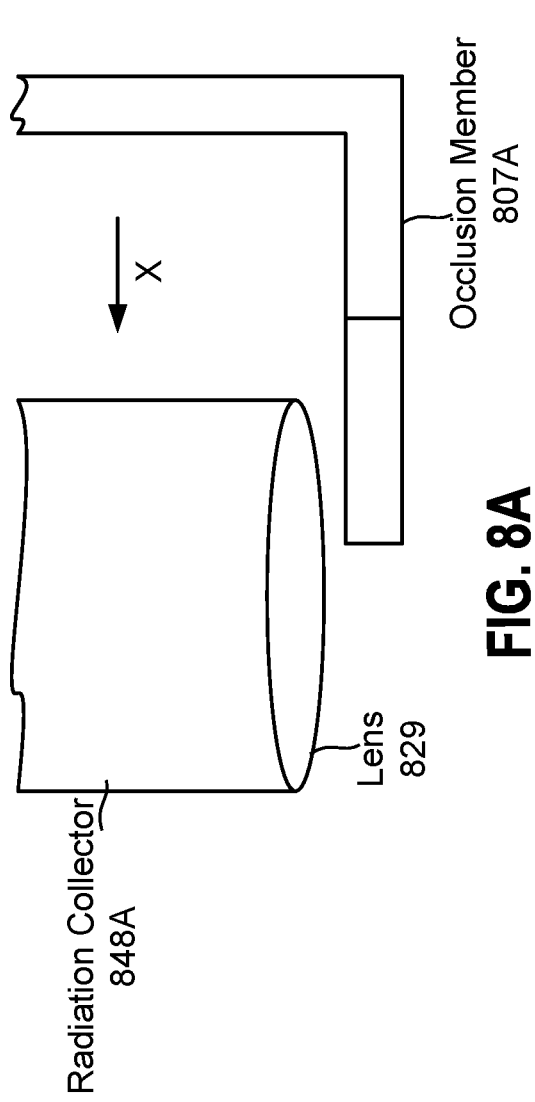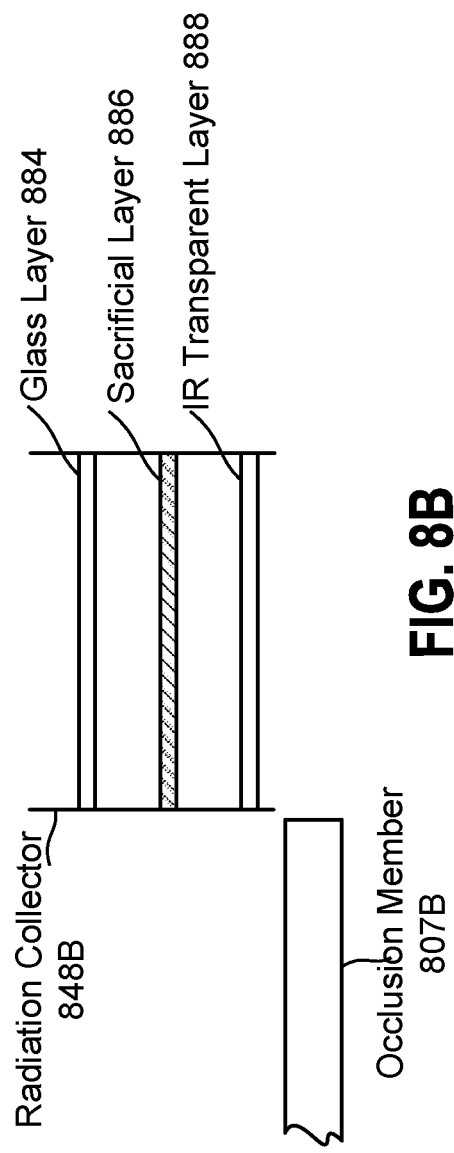

INFRARED RADIATION SENSING AND BEAM CONTROL IN ELECTRON BEAM ADDITIVE MANUFACTURING

BACKGROUND

Field

The present disclosure relates generally to additive manufacturing systems, and more particularly, adjusting parameters based on infrared (IR) radiation measurements in electron beam additive manufacturing systems.

Background

Additive Manufacturing ("AM") systems, also described as 3-D printer systems, can produce structures (referred to as build pieces) with geometrically complex shapes, including some shapes that are difficult or impossible to create with conventional manufacturing processes. AM systems, such as electron beam powder bed fusion (EB-PBF) systems, create build pieces layer-by-layer in a vacuum chamber. Each layer or 'slice' is formed by depositing a layer of metal powder on a powder bed during a re-coat cycle, and then exposing portions of the powder to an electron beam during a print cycle. During the print cycle, the electron beam is applied to melt areas of the powder layer that coincide with the cross-section of the build piece in the layer. The melted powder cools and fuses to form a slice of the build piece. The process can be repeated to form the next slice of the build piece, and so on. Each layer is deposited on top of the previous layer. The resulting structure is a build piece assembled slice-by-slice from the ground up.

SUMMARY

Several aspects of apparatuses and methods for infrared radiation sensing and beam control in electron beam additive manufacturing will be described more fully hereinafter.

In various aspects, an apparatus for an electron-beam powder bed fusion printer includes a radiation collector that receives infrared (IR) radiation from a powder bed surface, an IR sensor that determines IR information of the powder bed surface based on the received IR radiation, and an occlusion member that selectively masks or exposes the radiation collector or regions thereof.

In various aspects, a powder bed fusion apparatus includes an electron beam source that selectively fuses layers of powder on a powder bed, a radiation collector that receives IR radiation from a surface of the powder bed, a sensor that determines IR information of the powder bed based on the IR radiation, and an occlusion member that selectively exposes or masks at least a portion of the radiation collector.

Other aspects will become readily apparent to those skilled in the art from the following detailed description, wherein is shown and described only several embodiments by way of illustration. As will be realized by those skilled in the art, concepts herein are capable of other and different embodiments, and several details are capable of modification in various other respects, all without departing from the present disclosure. Accordingly, the drawings and detailed description are to be regarded as illustrative in nature and not as restrictive.

BRIEF DESCRIPTION OF THE DRAWINGS

Various aspects of infrared sensing and beam control in electron beam additive manufacturing will now be presented in the detailed description by way of example, and not by way of limitation, in the accompanying drawings, wherein:

FIGS. 7A-D illustrates exemplary embodiments of a radiation collector coupled to an occlusion member for selectively receiving IR radiation.

FIGS. 8A-B illustrate views of different exemplary configurations of the lens and occlusion member in accordance with different embodiments.

DETAILED DESCRIPTION

Figure 1A:
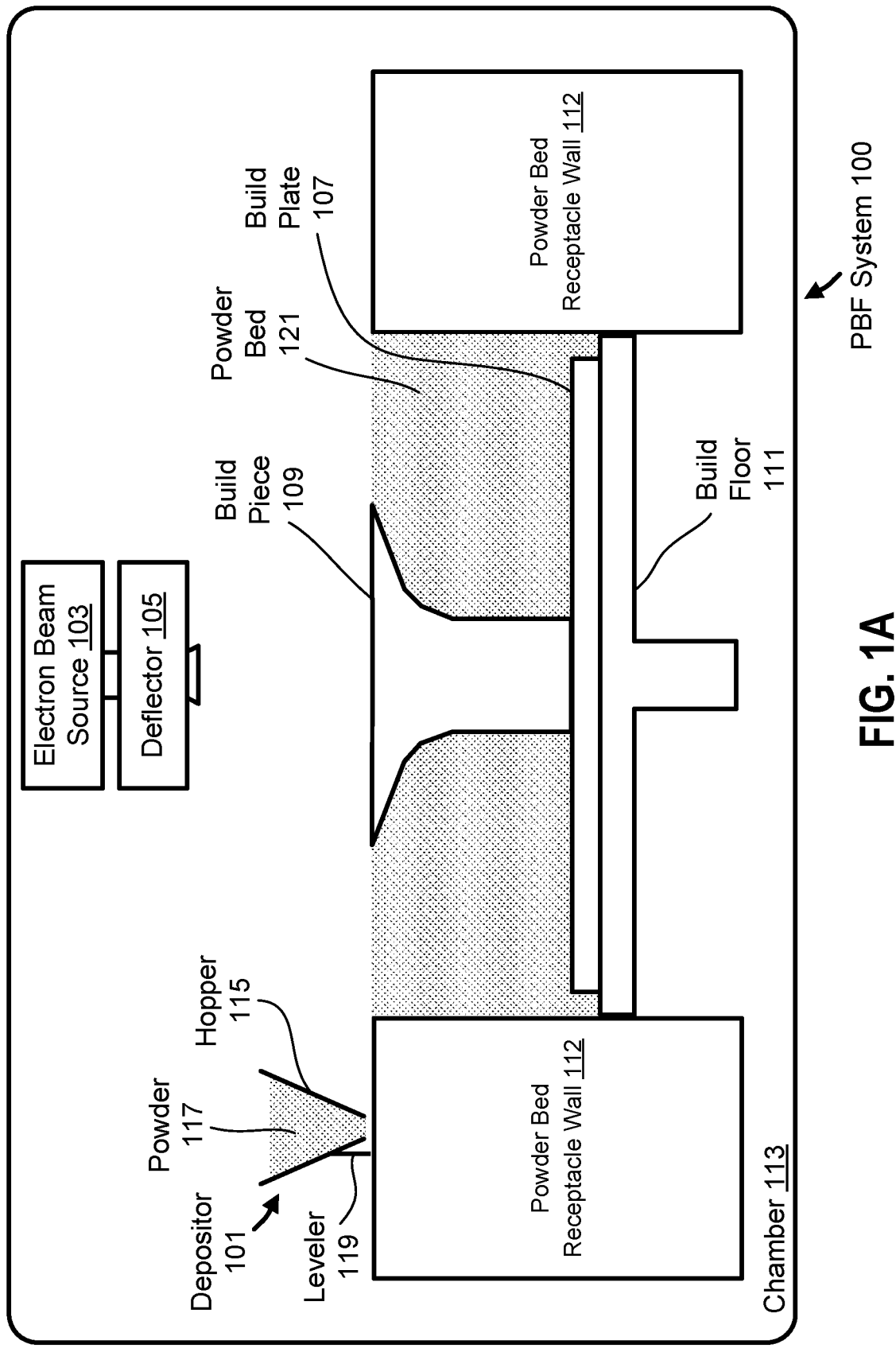
FIGS. 1A-D illustrate an exemplary PBF system during different stages of operation.

The detailed description set forth below in connection with the appended drawings is intended to provide a description of various exemplary embodiments of the concepts disclosed herein and is not intended to represent the only embodiments in which the disclosure may be practiced. The terms "exemplary" and "example" used in this disclosure mean "serving as an example, instance, or illustration," and should not necessarily be construed as excluding other possible arrangements or as preferred or advantageous over other embodiments presented in this disclosure. The detailed description includes specific details for the purpose of providing a thorough and complete disclosure that fully conveys the scope of the concepts to those skilled in the art. However, the disclosure may be practiced without these specific details. In some instances, well-known structures and components may be shown in block diagram form, or omitted entirely, in order to avoid obscuring the various concepts presented throughout this disclosure.

In EB-PBF systems, the proper electron beam intensity, scanning rate, and other printer parameters depend in part on the parameters of the powder bed surface, such as, for example, temperature. Adjustments to beam intensity and other modifications can be made in between printing runs, i.e., after a build piece is completely printed. For example, a lower beam power may be used for printing the next build piece if a measured temperature exceeds (or fails to meet) some threshold during an existing print run. Making accurate determinations of temperature and similar parameters of the powder bed surface is particularly important to avoid overheating of the powder bed, potentially damaging the build piece.

Such measurements are in practice difficult to accurately obtain, in part due to the chaotic environment of the vacuum chamber during a print cycle. For example, a portion of the loose powder can be vaporized by the electron beam, and the metal vapor can quickly condense on a surface of a temperature sensor, compromising measurement integrity. Incorrect temperature measurements in turn mean that the printer electronics cannot accurately adjust the electron beam intensity or the scanning rate on the fly. However, because an overheated powder bed may compromise the integrity of the build piece during a print job, it is undesirable to wait until the printer is between runs to obtain what may be non-current information about powder bed parameters like temperature and energy, and remedy the problem.

This disclosure is directed to the measurement of temperature in EB-PBF systems and the dynamic control of beam intensity based on these measurements and other factors. While the principles of this disclosure may apply to other additive manufacturing systems, the embodiments as described herein are in the context of electron beam powder bed fusion (EB-PBF) systems. EB-PBF systems generally include a vacuum chamber in which a powder bed is arranged. An electron beam source is positioned over the powder bed. During a re-coat cycle, a depositor, hopper, or other re-coat mechanism deposits powder in the powder bed. A leveler, such as a specially shaped blade, may be used to pass over the powder bed surface to spread the deposited powder into an evenly shaped layer. After the powder layer is deposited, a print cycle may occur in which the electron beam, based on instructions from a print controller, selectively scans the powder bed to fuse portions of the deposited layer by forming a weld pool of melted powder that quickly solidifies into an intended cross-section of the build piece being printed.

More than one build piece may be printed per print run, depending on considerations like the relative sizes of the build pieces and the powder bed. These considerations are largely accounted for in an earlier computer aided design (CAD) process conducted prior to the print run, wherein a designer renders a three-dimensional computer model or representation of the build piece(s). The CAD designs are compiled over the course of a few intermediate steps (e.g., supports may be generated where necessary to support overhanging portions of the build piece during printing, etc.). Ultimately the CAD designs are compiled into instructions that are compatible with and readable by the 3-D printer. For simplicity in this disclosure, a single build piece is illustrated. In addition, while the principles of this disclosure are described in the context of an electron beam source, the disclosure is equally applicable to a 3-D printer having other energy beam sources.

As briefly noted above, the electron beam source may be coupled to a print controller or other processor that executes the instructions to render the build piece. For example, the instructions may cause the depositor and leveler to deposit and level layers of powder during a re-coat cycle. The instructions also selectively manipulate the electron beam source during the following print cycle to fuse cross-sectional areas of the power layers to create a small section (i.e., a layer) of the overall build piece.

After the electron beam source has completed the current print cycle, another re-coat cycle is conducted and a further layer is fused over the existing layer in the manner described above. This sequence of print cycle and re-coat cycle continues to repeat until the requisite number of layers are deposited and the build piece is formed. Thereafter, the un-fused, loose powder particles and the build piece(s) can be removed from the vacuum chamber of the EB-PBF printer and the powder bed can be prepared for another print run.

In various exemplary embodiments, a radiation collector of an IR optical apparatus is arranged within the vacuum chamber and positioned above a surface of the powder bed. As used in this disclosure, "optical," "optics," "optical fiber," and the like refer to components, systems, etc., that operate, transmit, measure, etc., in the IR spectrum. The radiation collector may include a lens, receiver electronics, and a barrel portion (see, e.g., FIG. 4) coupled to an optical fiber cable for receiving radiation. For example, the radiation collector may include a lens or other IR-transparent material that includes IR optical fiber originating within the barrel portion, and the received radiation is passed via the radiation collector to the optical fiber.

In various embodiments, the lens or other IR-transparent material may focus radiation received during the 3-D printing process (i.e., during a re-coat cycle and/or a print cycle) onto the IR optical fiber cable. The IR optical cable may thereafter carry the radiation through an interface in a wall of the vacuum chamber to a sensor for determining IR information based on the received IR radiation. In various embodiments, the sensor may include a diffraction grating and a photodiode array for converting the received IR radiation to electrical signals for further processing. Additionally, the sensor may use a wavelength division multiplexer (WDM) or other circuit element for this purpose. The WDM may select one or more desired wavelengths or spectral ranges of the IR radiation. The WDM may be integrated with the rest of the sensor, or it may be a physically separate component from the remaining portions of the sensor.

The one or more selected wavelengths (or ranges thereof) may be provided to other circuits in the sensor for determining IR information of the powder bed surface based on the received IR radiation. For example, the IR radiation from the WDM may be provided to control circuits and/or a processor within the sensor for further processing. The control circuits may, for example, provide any necessary filtering, amplification, analog-to-digital conversion, etc. The CPU may make specific determinations using this electronic information. In an embodiment (see, e.g., FIG. 5), the processor and the other components of the sensor (e.g., control circuits and WDM) may be integrated as a single component. In other embodiments, the processor and the remaining circuits of the sensor may be physically separate components (see, e.g., FIG. 6). In either case, the sensor may include a CPU or other processing circuit(s) in order to determine the IR information based on the received IR radiation. Via the CPU, the sensor may further use the determined IR information, for example, to issue instructions to other components of the 3-D printer such as the print controller.

The radiation collector may be installed in different locations in the vacuum chamber and may be positioned to collect radiation from any portion of the powder bed surface. Depending on the configuration of the radiation collector, the radiation received from a surface of the powder bed may include a spectral region that broadly includes the IR spectrum, and portions of adjacent or other spectra (i.e., visible light and/or microwave, etc.). In this configuration, the radiation may be sent via an optical fiber cable to a sensor that includes a WDM or other circuit for extracting the desired IR wavelengths, as explained above.

The radiation collector may use transparent or sacrificial elements, or a combination thereof, one or more IR transparent films, or one or more specialized lenses, to extract the desired IR radiation. In the latter configuration, the optical fiber cable carries the IR radiation to the sensor. The sensor may further extract specific IR wavelength ranges from the IR radiation, e.g., using the WDM. In some alternative embodiments, e.g. where the radiation collector selectively blocks non-IR radiation using a specialized lens or material, the WDM may be omitted and the IR radiation may be provided via the optical fiber cable to another component (or set of components) in the sensor for converting the IR radiation into electrical signals.

The optical fiber cable receives the IR radiation in the vacuum chamber and carries the IR radiation to an external region having a generally normal atmospheric pressure (e.g., sea level or thereabouts) outside the vacuum chamber. In various embodiments, the IR radiation may be provided to a transducer (such as a photo-diode array) for converting the IR radiation into an electrical signal. In this embodiment, the photo-diode array may be part of a first stage of the sensor. The photo-diode array may in some embodiments use a diffraction grating. The output of the photo-diode array may be provided to the WDM or directly to the control circuits of the sensor (see, e.g., FIG. 5). The sensor also determines IR information based (whether directly or indirectly) on the IR radiation. In sum, the sensor may be arranged in a variety of possible configurations to perform the above-described functions, without departing from the scope of the present disclosure.

In various embodiments, the sensor may include one or more general purpose central processing units (CPUs) having registers, cache memory, random access memory (RAM), etc. In some embodiments, the sensor may include one or more dedicated circuits, such as application specific integrated circuits (ASICs), programmable array logic, digital signal processors, multiplexers, decoders, Boolean logic circuits, or the like.

IR information determined by the sensor may include, for example, temperature, a temperature profile, information representative of the temperature, or more broadly, any relevant surface characteristic that can be determined from the IR radiation. Examples of such characteristics other than temperature may include, without limitation, the spectral composition of materials at the relevant portions of the powder bed, the amount of loose particles affecting the scanning beam, the presence or absence of magnetic or electric fields and their amplitudes and polarization, and any other characteristics that are measurable and that may be used to improve the accuracy of the 3-D print process.

In an embodiment, the sensor can instruct a print controller to change one or more printer parameters on the fly based on the IR information. In another embodiment, the sensor can send temperature-related information or other information to a process controller or a print controller (which may include one or more processors and/or code sets running thereon, depending on the 3-D printer type and configuration). The process or print controllers may in turn issue instructions to change one or more printer parameters of the 3-D print job in or near real time upon receipt of the IR information. For instance, the IR information can include temperature information, and the print controller may dynamically adjust the beam intensity based on the temperature information. In this manner, the 3-D printer can use the sensor and print controller as part of a dynamic feedback loop to change various printer parameters responsive to the IR information. If the IR information reveals that the temperature is too high, the print controller may reduce the beam intensity, increase the scanning rate, etc., to avoid over-heating of the powder bed. Conversely, if the temperature is deemed too low, the print controller may increase the intensity of the electron beam, decrease the scanning rate, etc., to avoid under-heating of the powder bed.

In short, based on temperature or other factors, the print controller may dynamically increase or decrease the scanning rate or change other printer parameters to maximize the print quality. The sensor may determine IR information such as temperature directly from the IR radiation, or it may indirectly infer IR information based on information included in one or more spectra within the IR range. The sensor may also take multiple measurements over time and may build a profile or histogram of temperature data. The sensor may analyze the IR frequency spectrum and extract relevant results from this data as well. In some embodiments, the sensor may include a plurality of dedicated processors for performing these additional analyses.

In various embodiments, a printer parameter (or multiple printer parameters) of a PBF system can have different values at different times during a slice printing operation. For example, the scanning rate of the energy beam can be faster across one area of a powder layer and slower across another area of the powder layer. The temperature may be different in fused locations or weld pools during the printing. The radiation collector can receive IR radiation either during a print cycle or during a re-coat cycle, the sensor can determine IR information based on the IR radiation, and the print controller can make the appropriate adjustments based on the IR information, either in near real-time or in the next print cycle.

One of the advantages of using the IR spectrum based on a plurality of selected wavelengths is that in EB-PBF printers, the vacuum nature of the environment generally allows the powder bed surface to maintain stable temperatures. Thus, the IR radiation can be used as a reliable indicator of temperature. As discussed above, a feedback loop can be created where the sensor can elicit the IR information and feed the IR information forward to the next layer (e.g., by sending instructions or data to the print controller) to adjust speed, current, focus, or other printer parameters to maintain a well-controlled overall process. Alternatively or additionally, as discussed above, the radiation collector can receive the IR radiation on the fly, and provide the output to the sensor. The sensor can then elicit the temperature or other IR information from the IR radiation and can either adjust certain printer parameters in one embodiment, or it can forward the printer parameters to the print controller in another embodiment. In either embodiment, the sensor or print controller can adjust printer parameters such as the intensity of the electron beam, the electron beam focus, the scanning rate, etc. in or near real time.

One challenge in taking measurements during the print cycle is that during the scan, the electron beam may vaporize a portion of the loose powder, and the vaporized powder may be ejected from its position on the powder bed and fly up and interfere with the sensor. As an illustration of this problem, it is generally understood that when metal materials are heated in vacuum, the materials tend to boil. If the vacuum chamber gets to a certain threshold temperature, metallic particles at the atomic level may begin to spatter other sections of the chamber. As such, if a sensor is active during the print cycle, vapor from the vaporized powder is likely to condense on the surface of the lens or other IR-transparent material in use. The result is that the measurements of the IR energy become inaccurate, and so too do the determinations of temperature and other IR information.

In various embodiments, solutions to the spattering problem are introduced through the use of an occlusion member coupled to the radiation collector. For example, during vulnerable periods for the radiation collector such as when the electron beam is angled to strike the powder bed surface directly beneath the radiation collector, optical circuitry adjacent the radiation collector (or in other embodiments, the sensor or a separate processor) may adjust the occlusion member to partially or entirely cover the lens or other IR transparent material.

The occlusion member may be controlled by different components, depending on the configuration of the printer. In various embodiments, for example, the actions and movements of the occlusion member may be under the control of a circuit arranged proximate the occlusion member, such as the radiation collector control circuit 457 in FIG. 4. In those embodiments, the actions of the occlusion member may be directly controlled by the radiation collector control circuit or a motor or other mechanism included within the radiation collector control circuit, or otherwise attached to the radiation collector control circuit. In some embodiments, the radiation collector control circuit may control the occlusion member based on commands received from another source (e.g., using the control input/output interface 463 of FIG. 4). That other source may, for example, be the sensor or another dedicated CPU or control unit located outside the vacuum chamber. Alternatively, the occlusion member may be controlled by the radiation collector control circuit based on commands received from the print controller (see, e.g., FIG. 2), which may be the same controller that governs other major functions of the printer, such as scanning, re-coating, etc.

In various embodiments, the occlusion member includes a shutter that can be programmed to cover the lens at predetermined points in the measurement process. As an example, the shutter can close to cover the lens when the radiation collector is closest to the electron beam. As another illustration, when previous measurements have determined that the powder bed surface has heated to some threshold, the shutter may be closed to protect the integrity of the lens or IR material until an intensity of the beam has been reduced. Various other criteria may be used for determining when and under what circumstances to apply the shutter to protect the lens or other material used with the radiation collector.

In various embodiments, the radiation collector may use one or more IR-transparent materials that selectively reject non-IR frequencies. The occlusion member may operate to make visible a small portion of the material so that the radiation collector can receive IR radiation, while the remaining portion of the film material is covered. In still other embodiments described and illustrated in greater detail below, the occlusion member may be used as part of a mechanism that advances a strip of IR transparent film in alignment with the receiver portion 448 of the radiation collector (see FIGS. 4 and 7B) such that any given region of the film is used for a specified but limited period of time, after which the occlusion member advances the strip to expose a clean region for the radiation collector to receive IR radiation, while masking the remaining regions of the strip.

In similar embodiments, more than one glass, film or other IR transparent layer may be used in the radiation collector. For example, the transparent materials of the radiation collector may be stacked over one another such that geometrical sections of the outermost layer aligned with the radiation collector are progressively advanced over a plurality of time intervals to capture condensed vapor while the lens or materials underneath are kept free of condensation. Then, before condensation of vapor due to the spattering metal on the existing outermost layer/section becomes a significant problem, the outermost layer can be advanced (moved) into an area underneath another portion of the occlusion member, while a new section of the transparent outermost layer is concurrently made available. Using the new section of transparent material, the radiation collector can receive the IR radiation until the buildup of condensed vapor on the outer layer necessitates that the layer yet again be advanced to reveal still another new section. In other embodiments, the outermost layer may constitute the IR transparent layer itself, without the need for stacked layers.

In still other embodiments, the occlusion member may act as a rotary mechanism that rotates such that a new lens or material section becomes aligned with the receiver in the radiation collector until a time interval has passed, at which point the existing lens is masked. In various embodiments, the occlusion member may itself rotate downward and upward or may make other angled movements, depending on its design, to mask part or all of the radiation collector to avoid condensation.

Practitioners that are familiar with the EB-PBF printer in use and the types of build pieces constructed may have unique knowledge of portions of the scanning process that are more likely to result in the spattering phenomenon. As a result, they can program the radiation collector control circuit (or other device that controls the occlusion member) to close the occlusion member during these periods. Thus, when it is determined that condensation is more likely due to the heat and beam pressure, the radiation collector can be blocked to prevent vapor condensation, thereby protecting the radiation collector.

In other embodiments, the occlusion member may be operative to automatedly protect the lens or radiation collector during the print cycle, and to open during the re-coat cycle to enable the radiation collector to receive the IR radiation. Because the high temperatures of the powder bed surface may be sustained in vacuum for longer periods of time than other processes (e.g., laser PBF), taking measurements between scanning cycles may still have a high accuracy while avoiding possible damage to the radiation collector if used during the print cycle.

FIGS. 1A-D illustrate respective side views of an exemplary PBF system 100 during different stages of operation. As noted above, the particular embodiment illustrated in FIGS. 1A-D is one of many suitable examples of a PBF system employing principles of this disclosure. It should also be noted that elements of FIGS. 1A-D and the other figures in this disclosure are not necessarily drawn to scale, but may be drawn larger or smaller for the purpose of better illustration of concepts described herein. PBF system 100 can include a depositor 101 that can deposit each layer of metal powder, an electron beam source 103 that can generate an electron beam, a deflector 105 (such as a plurality of magnets) that can apply the electron beam to fuse the powder material, and a build plate 107 that can support one or more build pieces, such as a build piece 109. PBF system 100 can also include a build floor 111 positioned within a powder bed receptacle. The walls of the powder bed receptacle 112 generally define the boundaries of the powder bed receptacle, which is sandwiched between the walls 112 from the side and abuts a portion of the build floor 111 below. Build floor 111 can progressively lower build plate 107 so that depositor 101 can deposit a next layer. The entire mechanism may reside in a chamber 113 that can enclose the other components, thereby protecting the equipment, enabling temperature regulation in the vacuum chamber that encases the powder bed and mitigating contamination risks. Depositor 101 can include a hopper 115 that contains a powder 117, such as a metal powder, and a leveler 119 that can level the top of each layer of deposited powder.

Referring specifically to FIG. 1A, this figure shows PBF system 100 after a slice of build piece 109 has been fused, but before the next layer of powder has been deposited. In fact, FIG. 1A illustrates a time at which PBF system 100 has already deposited and fused slices in multiple layers, e.g., 150 layers, to form the current state of build piece 109, e.g., formed of 150 slices. The multiple layers already deposited have created a powder bed 121, which includes powder that was deposited but not fused.

Figure 1B:
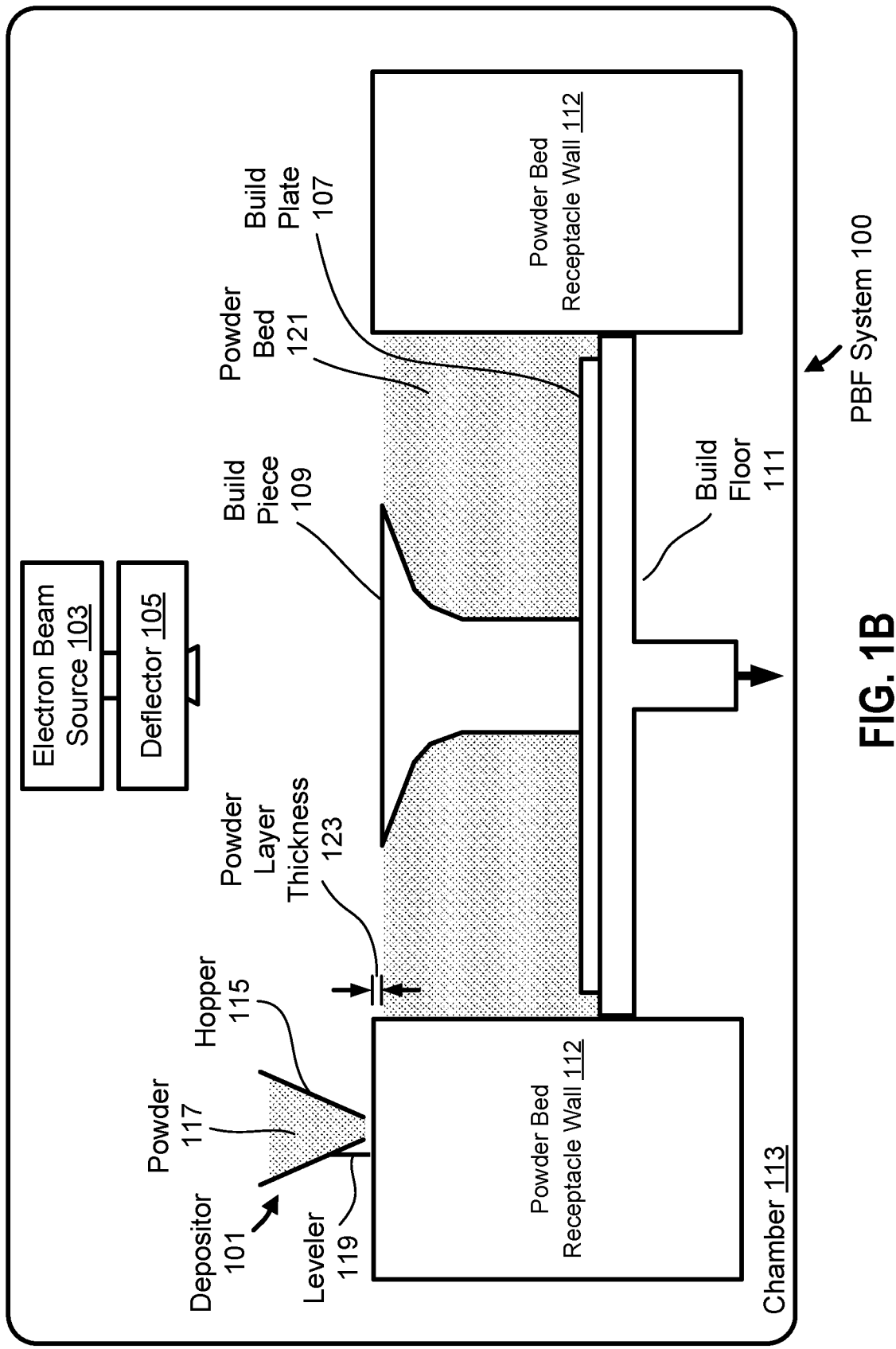

FIG. 1B shows PBF system 100 at a stage in which build floor 111 can lower by a powder layer thickness 123. The lowering of build floor 111 causes build piece 109 and powder bed 121 to drop by powder layer thickness 123, so that the top of the build piece and powder bed are lower than the top of powder bed receptacle wall 112 by an amount equal to the powder layer thickness. In this way, for example, a space with a consistent thickness equal to powder layer thickness 123 can be created over the tops of build piece 109 and powder bed 121.

Figure 1C:
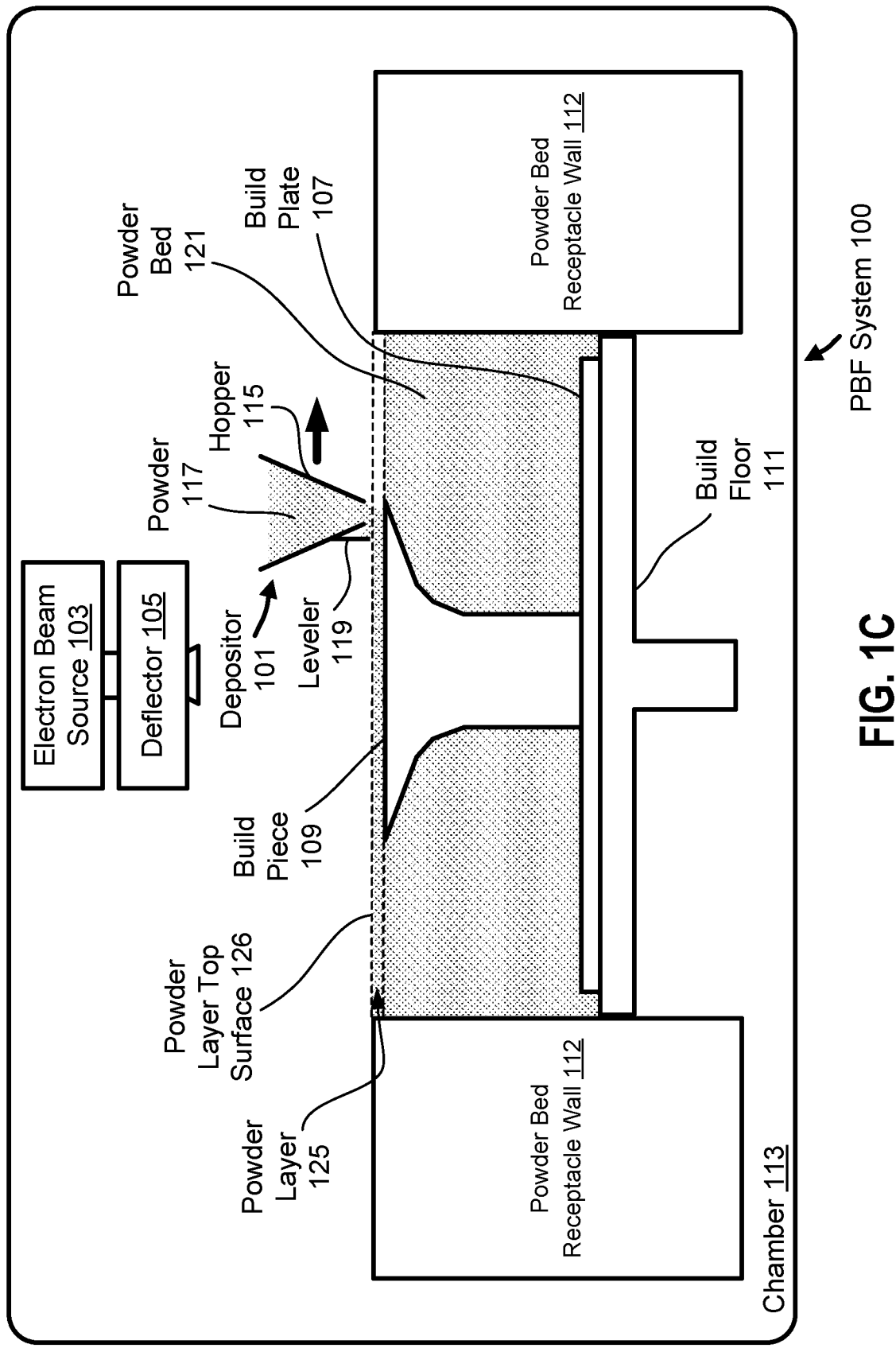

FIG. 1C shows PBF system 100 during the re-coat cycle, where depositor 101 is positioned to deposit powder 117 in a space created over the top of build piece 109 and powder bed 121 and bounded by powder bed receptacle walls 112. In this example, depositor 101 progressively moves over the defined space while releasing powder 117 from hopper 115. Leveler 119 can level the released powder to form a powder layer 125 that has a thickness substantially equal to the powder layer thickness 123 (see FIG. 1B) and that has a powder layer top surface 126 that is substantially flat. Thus, the powder in a PBF system can be supported by a powder material support structure, which can include, for example, a build plate 107, a build floor 111, a build piece 109, walls 112, and the like. It should be noted that for clarity, the illustrated thickness of powder layer 125 (i.e., powder layer thickness 123 (FIG. 1B)) is shown greater than an actual thickness used for the example involving 150 previously-deposited layers discussed above with reference to FIG. 1A.

Figure 1D:
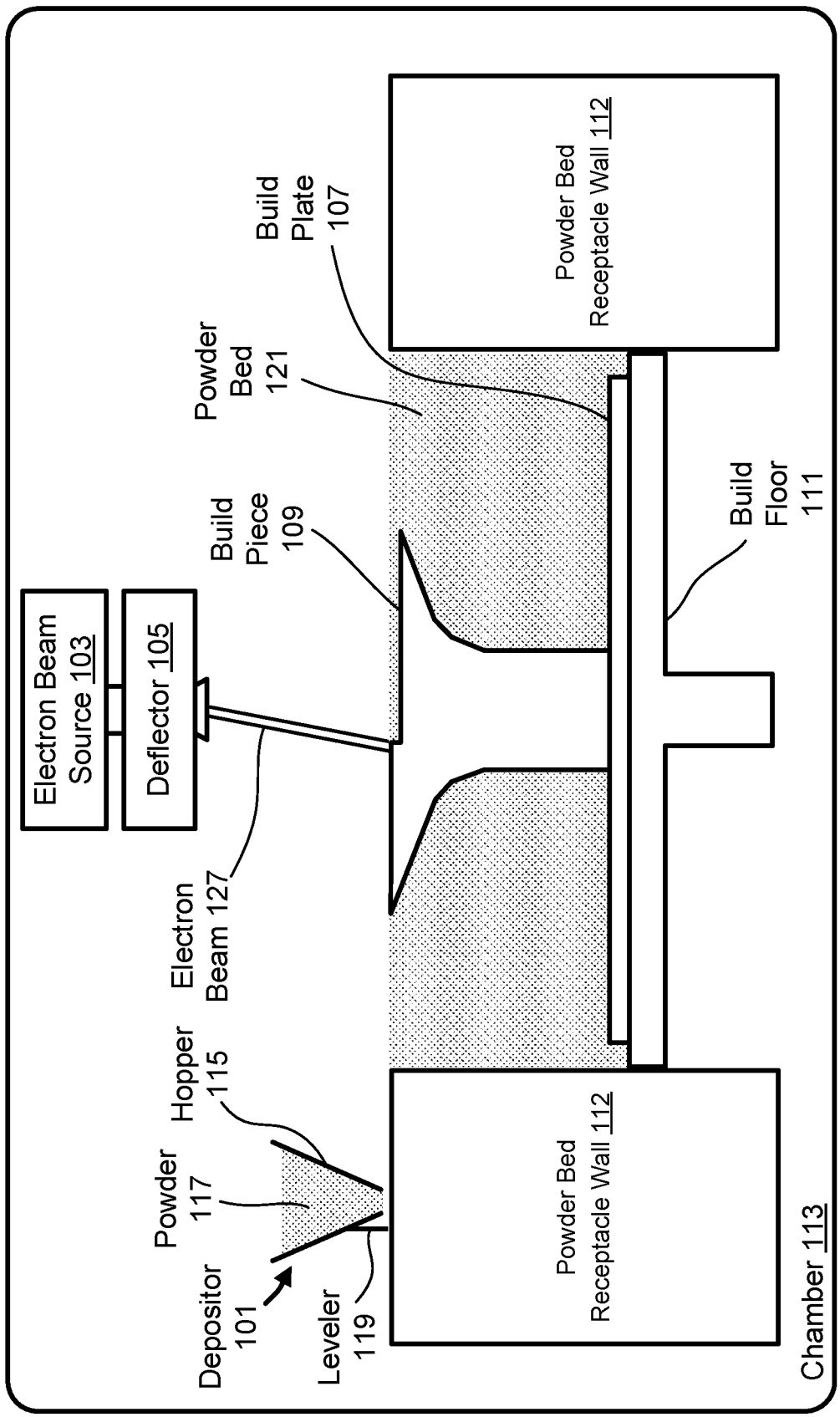

FIG. 1D shows PBF system 100 at a print cycle after the re-coat cycle in which, following the deposition of powder layer 125 (FIG. 1C), electron beam source 103 generates an electron beam 127 and deflector 105 applies the electron beam to fuse the next slice in build piece 109. Deflector 105 can include deflection plates that can generate an electric field or a magnetic field that selectively deflects the electron beam to cause the electron beam to scan across areas designated to be fused.

In various embodiments, the deflector 105 can include one or more gimbals and actuators that can rotate and/or translate the electron beam source to position the electron beam. In various embodiments, electron beam source 103 and/or deflector 105 can modulate the electron beam, e.g., turn the electron beam on and off as the deflector scans so that the electron beam is applied only in the appropriate areas of the powder layer. For example, in various embodiments, the electron beam can be modulated by a digital signal processor (DSP).

The operations of a PBF system, such as depositing the powder layer, generating the electron beam, scanning the electron beam, etc., are controlled based on the printer parameters of the PBF system (also referred to simply as "parameters" herein). Responsive to information elicited from one or more IR wavelengths, these printer parameters may be modified to maintain optimal printing conditions and to thereby maximize quality and integrity of the resulting build piece.

For example, one such printer parameter is the power of the electron beam generated by the electron beam source. In various PBF systems, the beam power parameter may be represented by, for example, a grid voltage of an electron beam source, a wattage output of a laser beam source, etc. Another example of a printer parameter is the scanning rate of the deflector, i.e., how quickly the deflector scans the electron beam across the powder layer. The scanning rate parameter can be represented, for example, by a rate of change of a deflection voltage applied to deflection plates in an electron beam PBF system. Another example of a printer parameter is the height of a powder leveler above a top surface of a previous powder layer, which can be represented as a distance of extension of the leveler.

Values of these printer parameters may vary with time. In various embodiments, at least one of the printer parameters has a first value at a first time during a slice printing operation, i.e., the time period beginning at the start of the depositing of the layer of powder and ending at an end of the fusing of the layer at various locations, and has a second value different than the first value during the slice printing operation. For example, a PBF apparatus can include a depositor that deposits a layer of a powder material based on a first subset of parameters (e.g., powder leveler height, composition of the deposited material, etc.), an electron beam source that generates an electron beam based on a second subset of the parameters (e.g., beam power), and a deflector that applies the electron beam to fuse the layer at multiple locations based on a third subset of the parameters (e.g., scanning rate), and at least one of the parameters can have different values during the slice printing operation. IR measurements may be taken at these different time periods and compared. Any one of these sets of printer parameters may be modified in response to the IR measurements. In addition, the IR spectra may be analyzed to evaluate the beam energy at different IR frequencies, and the first and second values of the system parameters may be modified during the printing operations.

Figure 2:
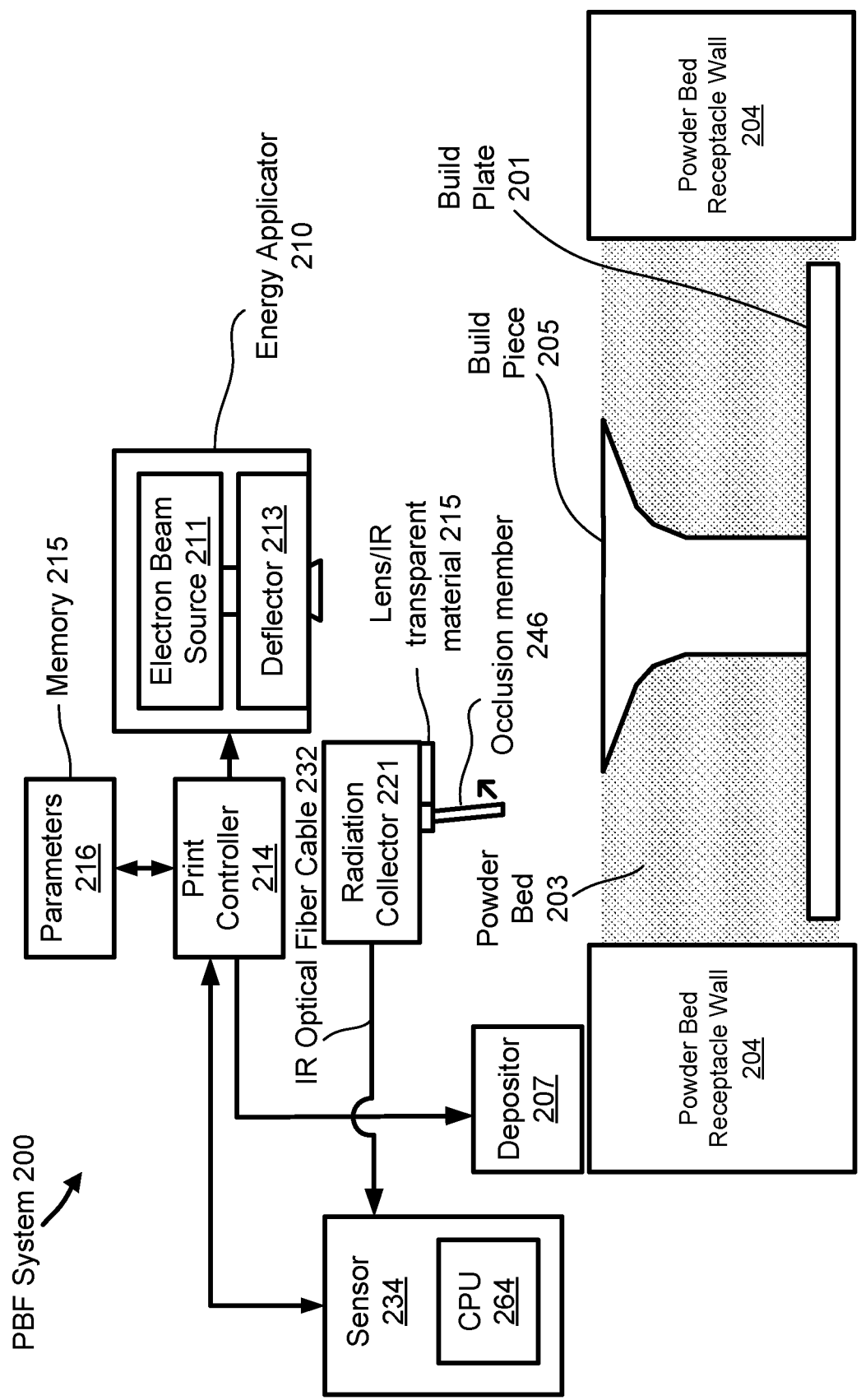
FIG. 2 illustrates another exemplary PBF apparatus including a radiation collector with an occlusion member for receiving IR radiation, a sensor for determining IR information, and a print controller for adjusting one or more parameters of the PBF system.

FIG. 2 illustrates another exemplary PBF apparatus including a radiation collector with an occlusion member for receiving IR radiation, a sensor for determining IR information, and a print controller for adjusting one or more parameters of the PBF system. Printer parameter variation may include, for example, reducing or increasing an intensity of the electron beam, and other actions described herein. FIG. 2 shows a build plate 201, a powder bed 203 within powder bed receptacle walls 204, and a build piece 205 in the powder bed. A depositor 207 can deposit layers of material including powder material in powder bed 203 during a re-coat cycle (also referred to as a deposit cycle), and an energy applicator 210 can apply an electron beam during a print cycle to fuse the powder material in the deposited layers.

Energy applicator 210 can include an electron beam source 211 that generates an electron beam and a deflector 213 that typically uses processor-controlled sets of magnets and/or grid plates for generating electric and magnetic fields to steer the electron beam across the deposited layer. PBF apparatus 200 can also include a print controller 214, which can be, for example, a computer processor or plurality thereof. Print controller 214 can issue instructions to the printer during the print and re-coat cycles for forming the build piece 205. In this role, print controller 214 may receive compiled code originating from the computer aided design (CAD)-generated 3-D design model of the build piece 205, and may issue instructions to various components within the PBF system 200 to 3-D print the build piece 205.

Print controller 214 may, for instance, control principle functions of the PBF apparatus 200 such as controlling re-coat parameters, scanning type, scan speed, beam intensity, beam steering, etc. That is, print controller 214 may issue instructions for directing the electron beam to move across the powder bed so as to print the build piece 205.

PBF apparatus 200 can also include a computer memory 215, such as a random access memory (RAM), computer storage disk (e.g., hard disk drive, solid state drive, flash drive), etc. Memory 215 can store parameters 216 for controlling components of PBF apparatus 200. Parameters 216 can include a printer parameter (or multiple printer parameters) that has two or more different values during a slice printing operation and that can be changed during operation of PBF apparatus 200. The parameters 216 may also be obtained during a re-coat cycle or on the fly during scanning via received IR radiation by a radiation collector 221 and IR information determined by a sensor 234 based on the received IR radiation.

Print controller 214 can use parameters 216 to determine the scanning rate, beam power, etc., to form each slice of build piece 205. In particular, print controller 214 can control depositor 207 to deposit a layer of material, can control electron beam source 211 to generate the electron beam, and can control deflector 213 to scan the electron beam across the deposited layer in a precise manner to obtain the modeled build piece 205. Further, in various embodiments, print controller 214 can control these components in the manner recited by using different determined values or types of printer parameters, and/or by using different determined subsets or combinations of printer parameters, in order to achieve a desired result for the specific printing operation at issue (such as managing overhangs, enhancing surface finish quality, optimizing printing speed, optimizing an overall combination of these and other operations, etc.).

In various embodiments, PBF apparatus 200 can include a radiation collector 221 that receives IR radiation from the surface of powder bed 203. That is, radiation collector 221 can receive IR radiation that radiates from a surface of powder bed 203 and that strikes a receiving surface of the radiation collector. For example, radiation collector 221 can include an optical device such as an IR-transparent lens or IR-selective material 215 to receive the IR radiation during a print job. The IR-transparent lens or IR-selective material can then focus the received IR radiation onto a region of an IR optical fiber cable 232.

Sensor 234 can receive IR radiation from the radiation collector 221 in order to gather various information about the vacuum environment in which the powder bed is present. In various embodiments, sensor 234 can convert the IR radiation received via the IR optical fiber 232 into an electrical signal for further processing. Sensor 234 may use this IR information to determine the temperature of the powder bed 203, for example. The IR spectrum may also include other information about the process, such as the frequency response of the scanning, the amount of total IR radiation, the composition of the materials and whether contaminants are present (e.g., using spectroscopy over the IR range), and similar capabilities.

Sensor 234 may further include a CPU 264 (or a plurality of CPUs or other processors) for evaluating the determined IR information.

Using CPU 264, sensor 234 may determine IR information in various ways from the received IR information. This information may then be stored in memory 215 or another storage medium or cache coupled directly to the sensor 234 and/or CPU 264. In addition, information from the parameters 216 in memory 215 or in another memory location may be considered in determining criteria like whether the determined IR information indicates temperatures or temperature ranges that are appropriate for the stage of the process in which the measurements were made.

In some embodiments, print controller 214 may be a processor that performs both general print functions and oversight of the PBF apparatus 200, and functions related to control of the radiation collector 221 and the sensor 234 used to determine IR information. In this capacity, print controller 214 may also evaluate IR information determined by sensor 234 and/or CPU 264. However, in other embodiments, PBF system 200 may include a separate processor for further analyzing IR information determined by sensor 234.

After determining IR information based on the received IR radiation, sensor 234 can provide print controller 214 with the determined information. Alternatively or additionally, sensor 234 can provide requests or instructions to print controller 214 to modify one or more printer parameters based on information received from the sensor 234. For example, if the IR information determined by the sensor 234 indicates that the temperature in the powder bed chamber is too high or too low, the sensor 234 may issue a request to the print controller 214 to increase or decrease the scanning rate or beam intensity, as appropriate based on this information.

CPU 264 may use its own local memory (not shown) to store IR information determined by sensor 234. One task of the CPU 264 can be to perform analyses of the IR information received by sensor 234 and to provide appropriate instructions to the print controller 214 based on the evaluation of the IR information by the CPU 264. In some cases, CPU 264 can perform an initial evaluation of the determined IR information, and then it can transmit selected parameters to print controller 214 for further evaluation.

In this example, print controller 214 can change the values of one or more parameters 216 in memory 215 based on information received from sensor 234 or CPU 264. Sensor 234 can also include a wavelength division multiplexor (WDM), e.g., located at an initial stage of the sensor where it receives IR radiation from the IR optical fiber cable (see, e.g., FIG. 5). The WDM component of the sensor can select certain IR frequencies, or IR frequency ranges, from the received IR radiation. The sensor may use this IR radiation to determine IR information. From this determined IR information, CPU 264 can further determine and identify criteria such as the temperature, temperature range, or temperature profile of a relevant portion of the powder bed 203. It will be appreciated that in various embodiments, WDM need not be directly connected to or integrated with remaining portions of the sensor 234.

Further, based on this IR information, sensor 234 or CPU 264 within sensor 234 can send a signal to print controller 214, the latter of which can adjust the intensity of the electron beam, the scanning rate, or other printer parameters, either on the fly or during the next anticipated print cycle. For example, where it is determined from the IR radiation that too much energy is causing an excessive amount of vaporization from the powder bed surface, the print controller 214 may receive information enabling it to take remedial steps to reduce the overall energy over the next several cycles. In the exemplary embodiment above, other parameters can be modified during the operation of PBF apparatus 200 based on feedback information received through sensor 234, resulting in a closed-loop control of printer parameters based on the IR information.

Referring still to FIG. 2, in various embodiments, radiation collector 221 may be coupled to an occlusion member 246. The occlusion member 246 may be used to block, partially block, or selectively block, the lens or IR transparent material 215 of the radiation collector 221 during times in which print controller 214 (or CPU 264 within sensor 234) determines that radiation collector 221 requires protection from the vaporized powder or other condensing particles in random or uncontrolled motion. These uncontrolled particles are often due to the volatile nature of the vacuum chamber during the print cycle, where the electron beam strikes the surface of the powder bed 203 at high temperatures. In various embodiments, radiation collector 221 may use lens/IR transparent material 215 for receiving IR radiation, and occlusion member 246 may include a shutter, pivot or other structure as described herein to protect the lens/IR transparent material 215 against condensation of vapor from vaporized powder particles or other contaminants that may otherwise tend to obscure the lens surface. Where protection of the lens/IR transparent material 215 is necessary, print controller 214 and/or sensor 234 may send a signal to a radiation collector control unit 357 (FIG. 3) to activate the occlusion member as appropriate.

Separate from receiving IR radiation, different or additional sensors may also be implemented in PBF 200 to make different measurements for a variety of other, potentially unrelated purposes. To this end, other, independent sensors may be present in the PBF system 200.

Figure 3:
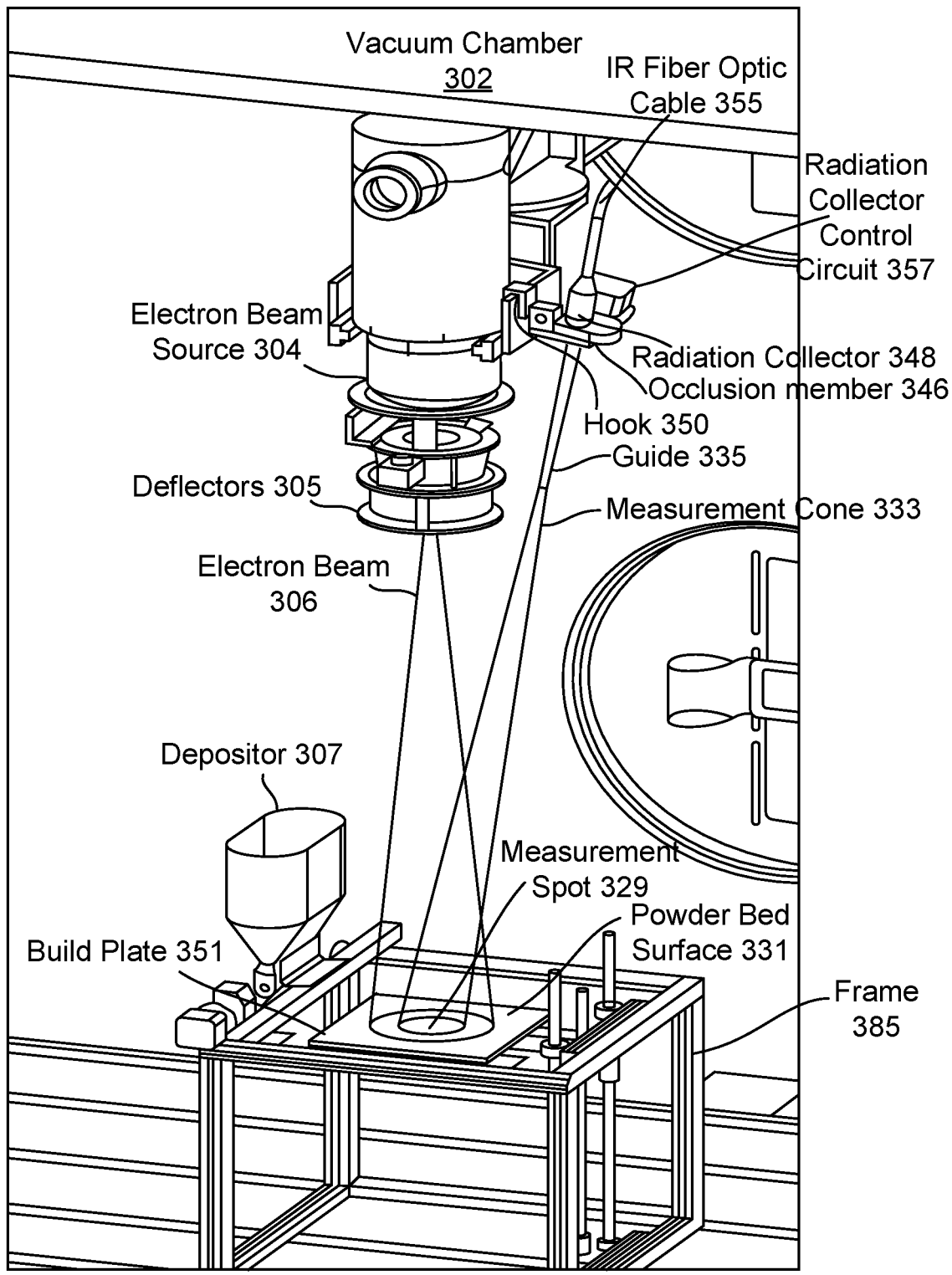
FIG. 3 is a perspective view of a vacuum chamber of an electron beam powder bed apparatus with a radiation collector adjacent the electron beam source.

FIG. 3 is a perspective view of a vacuum chamber 302 of an electron beam powder bed fusion apparatus with a radiation collector 348 adjacent the electron beam source 304. Initially it is noted that, while radiation controller 348 is arranged proximate the electron beam source 304, this arrangement need not be the case, and radiation collector 348 may instead be installed or positioned at any portion of the vacuum chamber 302 so that, for example, additional or different measurements may be made. Vacuum chamber 302 has been evacuated or substantially evacuated of air molecules in order to enable the electron beam source 304 to scan the respective powder layers during a print cycle without an atmosphere obstructing its path. In addition, the absence of an atmosphere prevents the powder particles from engaging in unwanted chemical reactions with air molecules such as via oxidation reactions, for example.

Electron beam source 304 may include deflectors 305 as described above for steering the electron beam 304 to the powder bed surface 331 at a measurement spot 329 determined by the print controller 214 or other code or logic during the scan. Here, the measurement spot 329 happens to coincide with the incident electron beam 306 at the powder bed surface 331, although this need not be the case and other surface regions may be aligned with the measurement cone 333 of the radiation collector 348. It will also be appreciated that the components in FIG. 3 are not necessarily drawn to scale, and the area of the build plate 351 and the powder bed surface 331 may be substantially larger in practical configurations.

The powder bed in this exemplary embodiment is supported at least in part by a frame 385. Depositor 307 may deposit a layer of powder during each re-coat cycle. The build plate 351 may be progressively moved downward after every cycle or every other cycle to accommodate a larger build piece and, in some embodiments, to maintain the electron beam source 304 at a generally constant distance from a surface 331 of the powder bed.

FIG. 3 further illustrates radiation collector 348, which can be an optical sensor for receiving radiation from the powder bed surface 331 at IR wavelengths. In various embodiments, sensor 348 uses a lens or an IR-transparent film or other material to selectively enable IR wavelengths of electromagnetic radiation to pass through and enter the radiation collector 348. It is expected that is some embodiments, electromagnetic radiation of non-IR wavelengths may also pass through, in which case other circuits (such as the wavelength division multiplexer 573 of FIG. 5) associated with a sensor can further divide the radiation into IR wavelengths or ranges thereof, while rejecting non-IR wavelengths of radiation.

In alternative embodiments, radiation collector 348 may also receive at least some non-IR wavelengths of radiation. In that case, the received radiation in radiation collector 348 may be passed through a WDM, and/or a diffraction grating to further separate the radiation into a spectrum of different wavelengths. The desired IR spectra can then be passed through a photo-diode array (see FIG. 6). In some embodiments, filters can be used to selectively pass through IR wavelengths. The photo-diode array thereupon converts the radiation to electrical signals which then can be processed accordingly. The diffraction grating and photo-diode array may be included as part of the sensor. Nevertheless, for purposes of this disclosure and to avoid unduly obscuring the concepts herein, the radiation collected by the radiation collector 348 in FIG. 3 will continue to be referred to as "IR radiation" even if in some cases, non-IR portions of the electromagnetic spectrum (e.g., ultraviolet or visible wavelengths) may also pass through the radiation collector 348 along with the IR radiation, and get rejected later.

Radiation collector 348 is coupled on one end to an occlusion member 346, which operates to selectively protect the lens or other IR-transparent film from the buildup of condensation due to the potentially chaotic environment of the vacuum chamber 302 when energy levels are high due to the scanning of the electron beam 306, causing vaporization. Powder particles and contaminants may be vaporized by the beam and in some cases, the vapor from the vaporized particles or contaminants may condense on the lens or IR-transparent material included in sensor 348.

Referring still to FIG. 3, the occlusion member 346 may be coupled to radiation collector control circuit 357. In some embodiments, radiation collector control circuit 357 is a dedicated processor which controls the occlusion member to open and close the sensor under different sets of circumstances. Radiation collector control circuit 357 may in some embodiments be connected to the print controller 214 or the CPU 264 of sensor 234 (FIG. 2), wherein the protection of the radiation collector 346 and its lens can be coordinated with other components in the IR measurement process.

In still other embodiments, occlusion member 346 may instead be directly controlled by instructions from another processor, such as the print controller 214 or CPU 264, etc. (FIG. 2).

Radiation collector 348 is coupled in this embodiment via hook 350 to the electron beam source 304, meaning that the sensor 348 is disposed close to the electron beam 306. Further, sensor 348 is angled towards the area of powder bed surface 331 that energy beam 306 scans, as shown by measurement spot 329. Accordingly, it may be desirable to program the occlusion member to allow the radiation collector 348 to take periodic measurements for a comparatively short duration of the time and to block and thus protect radiation collector 348 for an equal or larger duration of time, to prevent condensation of vapor on the radiation collector.

In other embodiments, radiation collector 348 may be angled away from electron beam source 304, such as being pointed to a measurement spot away from the region where the electron beam 306 strikes the powder bed surface 331. In this case, radiation collector 348, while still vulnerable to vapor condensation, may be able to take longer measurements, without being blocked by the occlusion member 346. In other embodiments, radiation collector 348 may be operable to receive IR radiation during the re-coat cycle when the electron beam source 304 is off and depositor 307 is depositing another layer of powder. In these latter embodiments, the radiation collector 348 may be able to sense IR radiation for longer time periods since electron beam source 304 is ordinarily disabled during the re-coat cycle and substantial vaporization of powder is less likely.

In the embodiment of FIG. 3, radiation collector 348 includes a guide 335 that can be used when the occlusion member is not active to minimize the aperture size for receiving the IR radiation or to assist in focusing the radiation collector. The resulting measurement cone 333, which represents the radiation (of all spectra) received at the input of the guide 335, travels up to the sensor 348 where it strikes a lens or other transparent IR material. Thereafter, the resulting IR radiation may be focused on an optical fiber or another designated focal point structure. The IR radiation can travel through the optical fiber cable 355 to a sensor. One advantage of measuring IR radiation is that, unlike with some high frequency measurements (e.g., X-rays) where the energy of the radiation is too high to allow routing through an optical fiber cable, in the IR embodiments the energy levels are low enough to allow the IR radiation to be routed through the optical fiber cable 355 to additional circuitry outside the vacuum chamber for ease of processing.

A number of embodiments of the sensor and occlusion member are possible, and representative such embodiments are discussed in greater detail below.

Figure 4:
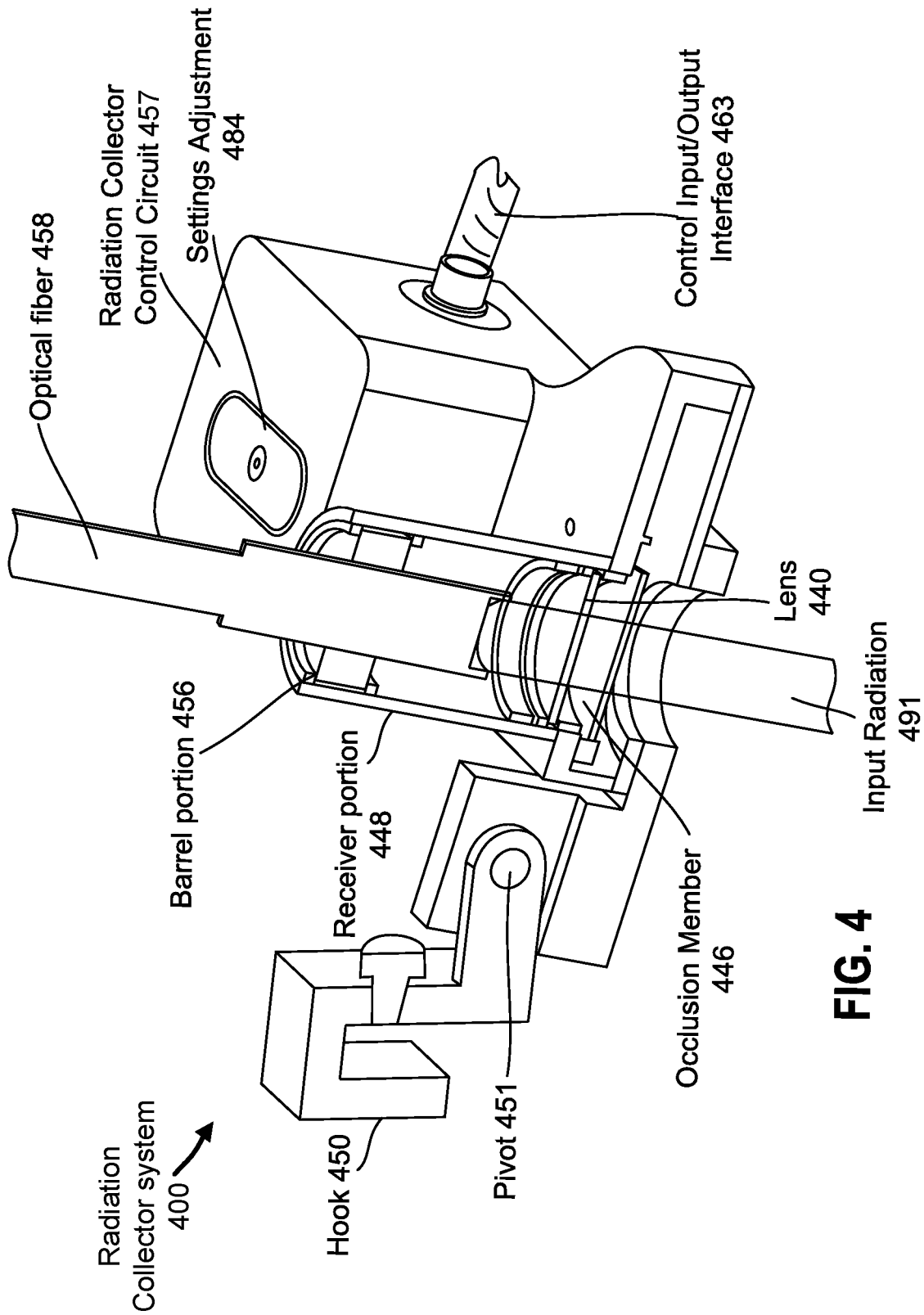
FIG. 4 is a cross-sectional perspective view of a radiation collector system having a radiation collector control circuit for use in an EB-PBF system.

FIG. 4 is a cross-sectional perspective view of radiation collector system 400 having an IR receiver portion 448 for use in a vacuum chamber of an EB-PBF system. The cross-section in this view effectively shows a semi-circular cutoff inside radiation collector system 400. The receiver portion 448 of the radiation collector system 400 has a barrel portion 456 through which radiation 491 input from the powder bed surface is guided. The receiver and barrel portions 448, 456 of radiation collector system 400 form a solid external radiation collector surface. The radiation collector system receives radiation 491 input from the vacuum chamber.

The radiation collector system 400 also includes a lens 440. In some embodiments, the receiver portion 448 of the radiation collector system 400 may include a plurality of lenses, e.g., for blocking different wavelengths of non-IR radiation. In some embodiments, the receiver portion 448 uses the lens 440 to selectively receive IR radiation from a designated portion of the powder bed surface. The lens 440 concentrates received radiation onto a region of an IR optical fiber 458. The optical fiber is housed within an external sheath (not shown for simplicity) to form an IR optical fiber cable for carrying the input radiation 491 out of the vacuum chamber to a sensor where the radiation can be further processed. The radiation collector system 400 also includes hook 450 and pivot 451 to enable the system to hang on a ledge (see, e.g., FIG. 3) and to be properly angled.

FIG. 4 also shows that the receiver portion 448 of the radiation collector system 400 includes occlusion member 446. In various embodiments, the occlusion member 446 is controlled by radiation collector control circuit 457 which is positioned adjacent the radiation collector. For example, when the occlusion member 446 is engaged, it may slide laterally to cover lens 440. While the occlusion member 446 is shown in FIG. 4 as a generally flat structure, the shape of occlusion member 446 may vary. Occlusion member 446 may be connected to the radiation collector control circuit 457 to receive control signals. Occlusion member 446 is shown in the exemplary embodiment of FIG. 4 as a thick, opaque sheet of material that can slide out and close over the receiver portion 448 of radiation collector system 400, thereby protecting the lens 440. However, as demonstrated below, occlusion member 446 may also include additional or different geometries in other embodiments.

Radiation collector control circuit 457 includes a cover inside of which a user can obtain access to settings 484 used by the radiation collector control circuit 457. In some embodiments, radiation collector control circuit 457 further includes a processor for controlling the angle and activity of radiation collector system 400 and/or occlusion member 446. In other embodiments, these tasks are relegated to a processor outside the vacuum chamber.

Radiation collector control circuit 457 may also include a control input/output interface 463 for communicating with print controller 214, sensor 234 or CPU 264 within sensor 234 (FIG. 2), for example. In some embodiments, I/O interface 463 may receive instructions from the print controller 214, from sensor 234, or from another processor, and radiation collector control circuit 457 may use the obtained instructions to manipulate or position the radiation collector system 400 and/or occlusion member 446 as necessary. The instructions provided to interface 463 may relate to the timing that the radiation collector system 400 is to be active, the cycle of activity, the angle and position of the radiation collector system 400 if the radiation collector's motion is automatedly controlled, the motion and activity of occlusion member 446, etc.

In one embodiment, the occlusion member 446 is operative to cover the lens 440 during the print cycle, and to expose the lens 440 during the re-coat cycle. During closing, the occlusion member 446 can, for example, be extended outward to block and thereby protect lens 440, and during opening, the occlusion member 440 can be withdrawn inward to expose lens 440 to allow receipt of radiation 491 from the powder bed surface. As shown in subsequent embodiments, the occlusion member 440 may instead be configured to rotate or pivot to protect the lens 440 or transparent surface, or it may be controlled to manipulate IR-transparent material (see FIGS. 7A-D) used in place of or in addition to the lens 440 to protect the sensor 448 from the vacuum environment during the print cycle.

In various embodiments, the occlusion member 446 can include a shutter. The occlusion member 446 can have symmetrical portions that are designed to shut together during closing and cover the lens. The shutter may operate to block radiation as well as vaporized powder and atoms from building up on the lens 440. In other embodiments, the timing requirements of the occlusion member 446 may be more complex, in which case the control input/output interface 463 may carry instructions used by the radiation collector control circuit 457 to adjust the occlusion member 446 in real time based on other factors, e.g., the perceived risk of excessive condensation on a lens 440 of sensor 448, prior measurements of other IR-related parameters, etc.

After the IR radiation 491 is received at the lens 440, the IR radiation is focused onto the optical fiber 458 and transmitted out of the vacuum chamber.

Figure 5:
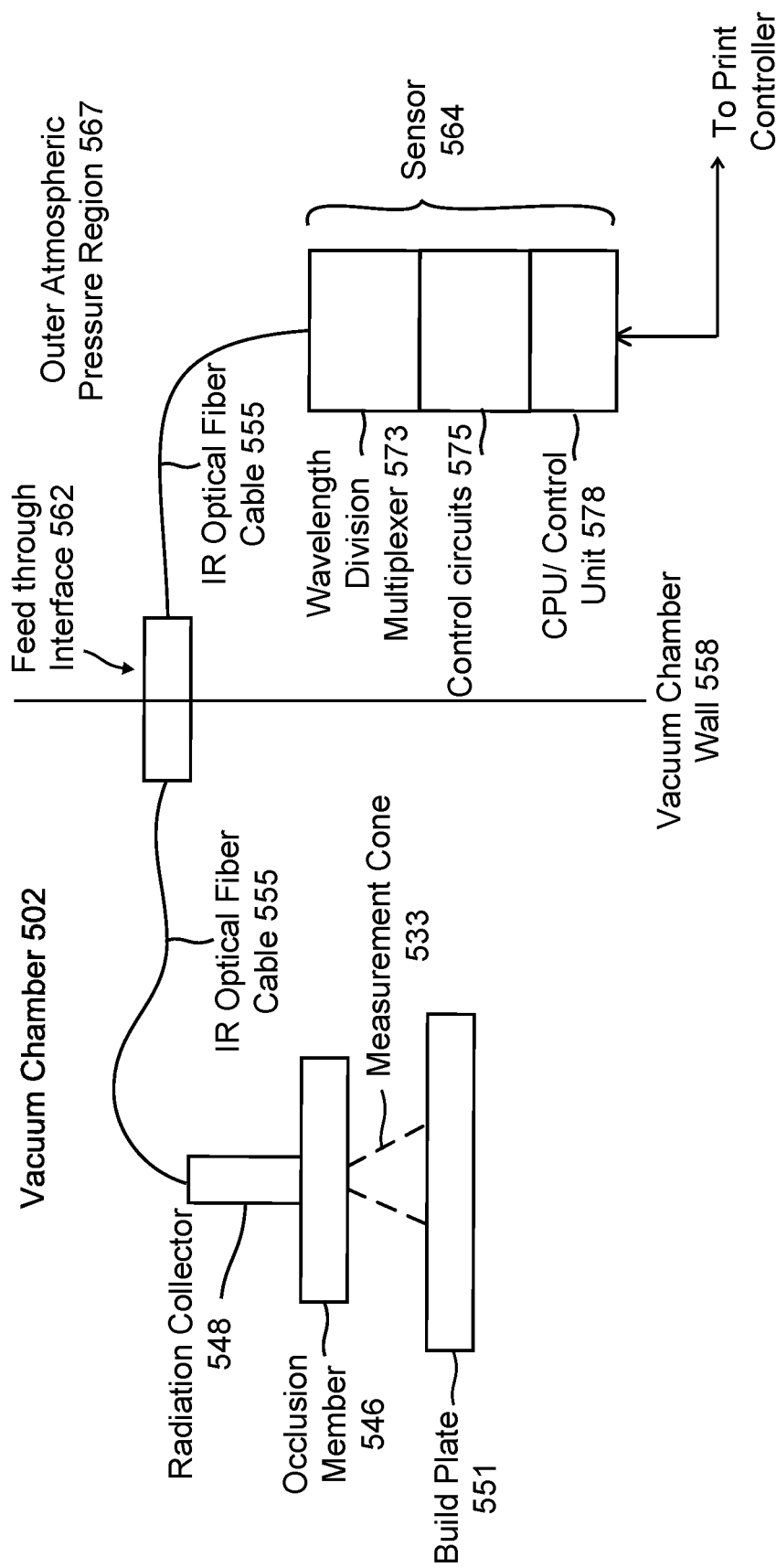
FIG. 5 is a block diagram illustrating a radiation collector in a vacuum chamber of a PBF apparatus for receiving IR radiation and a sensor in an outer atmospheric pressure region for determining IR information based on the received IR radiation.

FIG. 5 is a block diagram illustrating a radiation collector 548 coupled to an occlusion member 546 in a vacuum chamber 502 and a sensor 564 located outside the vacuum chamber that receives the IR radiation via an optical fiber cable 555 and a feed through interface 562. In this view, vacuum chamber 502 includes a build plate 551 of the PBF system, which is operative to receive deposited powder layers to print an object. For clarity, the electron beam source and other components specific to the printing capabilities are omitted from the diagram. Underneath radiation collector 548 is occlusion member 546 for selectively protecting the radiation collector. While occlusion member 546 is illustrated as blocking radiation collector 548, in this embodiment occlusion member 546 includes an aperture (obscured from view) for allowing radiation from a powder bed surface to be received at the radiation collector input. In various embodiments, occlusion member 546 may be moved horizontally by a sufficient amount to allow radiation to pass to the radiation collector 548. The powder bed surface (omitted from view) is supported by the build plate 551 and powder bed walls, the latter of which in some embodiments may be the vacuum chamber walls described in FIGS. 1A-D.

A measurement cone 533 represents the field of view of the radiation collector 548. The radiation collector uses a lens or other transparent IR material to concentrate the received radiation onto a focal point such as a portion of the optical fiber cable 555, and the optical fiber cable 555 carries the IR radiation initially through a feed through interface 562 built into the vacuum chamber wall 558. The feed through interface 562 is sealed to retain the vacuum in vacuum chamber 502 and to allow only the optical fiber cable 555 to pass through. The feed through interface 562 includes a seal that may be implemented using a suction apparatus, adhesive, or similar mechanism. This ensures separation between the vacuum chamber 502 and the outer atmospheric pressure region 567, which is any area of the PBF system external to the vacuum chamber 502 that is at ordinary atmospheric pressure conditions. In an exemplary embodiment, the fiber optic cable 555 passes the IR radiation to a sensor 564.

In various embodiments, the sensor 564 includes a dedicated CPU 578 and control circuits that are separate from, but may be coupled via electrical connections to, the print controller 214 (FIG. 2). In the embodiment of FIG. 5, the IR radiation is received from the IR optical fiber cable 555 and provided to a sensor 564. In an embodiment, the sensor 564 includes WDM 573, control circuits, and a CPU/Control unit 578 as further described below. In short, the sensor 564 determines relevant IR information (such as, for example, powder bed temperatures, temperature profiles, and other parameters of the vacuum chamber) based on the received IR radiation. Sensor 564 thereupon sends instructions to a print controller, similar to print controller 214 of FIG. 2, to modify various parameters based on the received information. The instructions from the sensor 564 to the print controller may include, for example, an instruction to reduce the intensity of the electron beam in the event the temperature of the powder bed is too high. Alternatively, the instruction from the sensor 564 to the print controller may be to increase the beam intensity if the temperature is too low. The sensor 564 may alternatively instruct the print controller (e.g., print controller 214) to adjust the scanning rate of the electron beam. In other embodiments, the print controller 214 may instead carry out the functions, at least in part, of processor 564 of analyzing the IR information determined by the sensor.

Sensor 564 includes three components in the illustrated embodiment. A first exemplary component of sensor 564 includes WDM 573. WDM 573 may extract specific IR wavelengths or spectral bands of select IR wavelengths from the input radiation source, which source may include the entire input IR array and potentially other spectra that may not have been previously filtered out by radiation collector 548. It should be understood that, while WDM 573 is part of sensor 564 in the embodiment of FIG. 5, WDM 573 may be a separate circuit and need not be integrated with other components of sensor 564. In some embodiments, filters or other types of circuits may be used in place of the WDM.

A second exemplary component of sensor 564 includes control circuits 575. In some embodiments, control circuits 575 may include a transducer for converting the extracted IR radiation to an electrical signal, having the same frequency characteristics, phase, and relative amplitudes of the corresponding extracted IR radiation. The control circuits 575 may also perform other relevant functions such as providing any necessary filtering, analog-to-digital conversion, and amplification of the received signal. In other embodiments, the control circuits 575 may come before WDM 573. That is to say, these functions may be performed in different sequences in various embodiments, depending in part on the type of circuits and structures used. Also, in various embodiments, the control circuits 575 may be configured to analyze the IR radiation (or converted electrical signal) and obtain one or more of a temperature, temperature information, a temperature profile, or a representative model of the frequency spectrum/frequency characteristics of the IR radiation. In various embodiments, this IR information is instead evaluated by CPU/control unit 578, which in some embodiments is a third exemplary component of sensor 564. In the latter case, the control circuits 575 can prepare the received IR radiation by converting it to electrical signals (except where that function is performed by the WDM 573 or another circuit within the sensor), converting the received signals from analog to digital signals and otherwise preparing the signals for analyses by the CPU/Control unit 578 portion of sensor 564. In some embodiments, part or all of the functions of control circuits 575 can be located in one or more circuit elements separate from sensor 564.

CPU/control unit 578 may further analyze the received information from control circuits 575. For example, CPU/control unit 578 may execute code for mapping or graphing the IR information, and may store relevant compilations of the IR information in a memory for later use or comparison purposes. The CPU/control unit 578 may directly or indirectly obtain other information from the IR information determined by sensor 575, including for example, the total energy. The CPU/control unit 578 may also analyze this information as a function of time in lieu of or in addition to frequency.

The CPU/control unit 578 may evaluate different regions of the powder bed based on the sensor determining different sets of IR information corresponding to different measurements if the IR radiation over time. The CPU/control unit 578 and synthesize this information to determine what actions to take, if any, in the current or a future print run. The CPU/control unit 578 may store this determined IR information in memory for future use. In some embodiments, the CPU/control unit may pass this information to print controller 214 (FIG. 2), which may perform similar tasks or additional analyses of the determined IR information. In addition, in various embodiments, the CPU/control unit 578 of sensor 564 may issue instructions to the print controller to modify the intensity of the electron beam and the scanning rate based on the IR information determined by the sensor 564.

Another exemplary function of CPU/control unit 578 is to provide instructions to WDM 573 and/or to control circuits 575. That is, the actions of the IR sensors 575 as described above may be facilitated and controlled by the CPU/control unit 578. The CPU/control unit 578 may constitute any suitable type of control unit, digital signal processor (DSP), or other general purpose or dedicated processing or control unit within sensor 564. In some embodiments, each of these three components 573, 575 and 578 are separate, and not integrated as a single sensor. For example, the CPU/control unit 578 may be a separate processor to provide control and to act as an input/output interface for remaining portions of the PBF system. Sensor 564 may in this case be deemed to include CPU/control unit 578, as well as the including WDM 573, control circuits 575, and any transducers that convert the IR radiation into an electrical signal. Sensor 564 can use these components to send instructions to the print controller (e.g., print controller 214) to perform one or more actions with respect to the received IR information or to perform further analyses based on the information received from sensor 564.

In addition, in various embodiments, sensor 564 may forward one or more of the obtained temperature information, temperature profile, temperature ranges, or other IR information regarding the IR radiation and relevant characteristics thereof to the print controller (e.g., print controller 214). As an example, the sensor 564 may use control circuits 575 to extract a composite signal comprising IR information concerning a plurality of IR wavelengths. The sensor 564 may determine (e.g., via CPU/control unit 578) temperature information corresponding to a current surface of the powder bed at a given region. The sensor 564 may further use CPU/control unit 578 to forward this temperature information to the print controller 214. The print controller may determine that the temperature is too high. In response, the print controller may issue instructions to lower the intensity of the electron beam. The print controller may also issue instructions to modify one or more additional printer parameters relevant to the print, such as scanning rate. The print controller may also signify a time for its requested actions to take effect. For instance, in some embodiments, the intensity of the beam may not be modified until the next print cycle. In other embodiments, the intensity of the beam may be modified immediately. Other characteristics or parameters of the print may also be modified.

It will be understood by those skilled in the art on perusal of this disclosure that the sensor 564 and print controller 214 may in some embodiments be executed from a personal computer (PC), server device, or other computer positioned adjacent to or networked to the PBF system. Thus, while in various embodiments a single processor or a plurality of dedicated processors are integrated into the PBF system, in other embodiments the PBF system may receive instructions from other circuits, processors, computers, or CPUs that may be coupled to, but are not directly integrated with, the 3-D printer itself.

Figure 6:
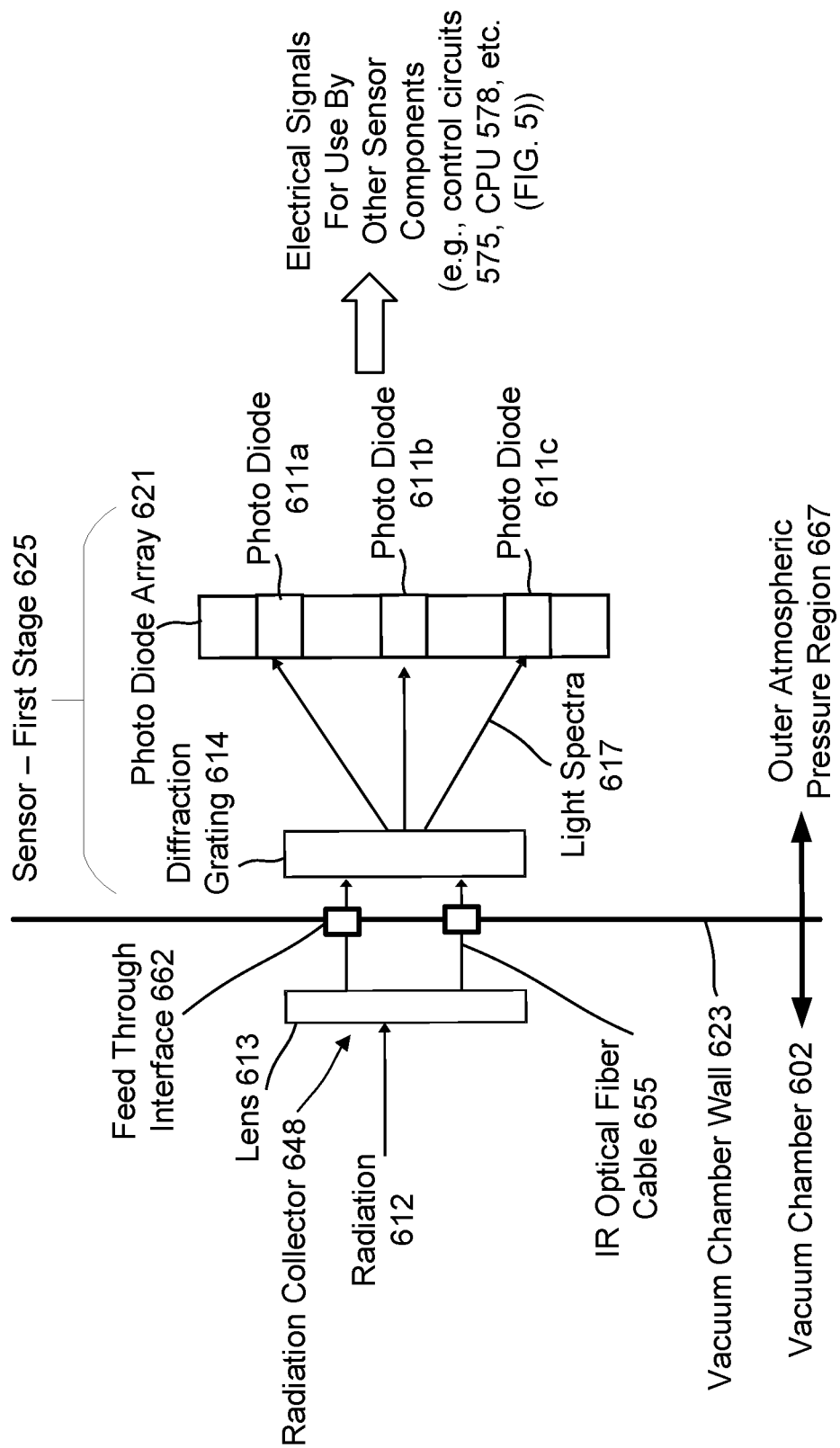
FIG. 6 is a block diagram illustrating a radiation collector in a vacuum chamber of a PBF apparatus for receiving IR radiation and an initial sensor stage in an outer atmospheric pressure region for converting the IR radiation into electrical signals.

Referring still to FIG. 5, in other embodiments, the sensor 564 may make one or more of these determinations (e.g., regarding whether to change some printer parameter such as beam intensity, scanning rate, deposition speed, or to provide a waiting time until the system cools down, etc.) in concert with the print controller or independently. If independently, sensor 564 may transmit requests to the print controller to modify the beam intensity, scanning speed, provide waiting time until the next scan, and the like FIG. 6 is an exemplary view of the radiation collector 648 in a vacuum chamber 602, and a stage 625 of the sensor in an outer atmospheric pressure region 667 for determining IR information based on received IR radiation in an EB-PBF printer. Here, the stage 625 converts the received IR radiation into an electrical signal for further processing by remaining components of the sensor. Initially included is a portion of radiation collector 648 in the vacuum chamber 602, which includes a lens 613 for receiving radiation 612 from a surface of the powder bed. Alternatively or in addition, a selected IR transparent material may be used in addition to or in place of the lens. In other embodiments, multiple sacrificial and focusing elements may be implemented. The sacrificial elements can be partially opaque. The sacrificial elements may initially reject very high energy wavelengths, for example, and the focusing elements (e.g., lens 613) can concentrate light onto an optical fiber. The occlusion member is omitted from view in this embodiment.

In the embodiment shown, the received IR radiation 612 is transmitted over one or more IR optical fiber cables 655 out of the vacuum chamber 602 via feed through interface 662 (and thus through the vacuum chamber wall 623), and into the outer atmospheric pressure region 667. There, the received IR radiation is provided to a diffraction grating 614. The diffraction grating 614, which represents along with photodiode array a first stage 625 of a sensor for determining IR information based on IR radiation, diffracts a spectrum of the received radiation, including the IR radiation, onto a surface of the photodiode array 621. Using this technique, IR radiation can be selectively transmitted onto the photodiode array 621, and any non-IR radiation can be rejected. In various embodiments, other techniques may be used by the sensor to preferentially reject any non-IR radiation and convert IR radiation into electrical signals.

At photodiode array 621, a plurality of individual photodiodes 611a-c can be used to convert the received IR radiation into electrical signals that are then sent to remaining portions of the sensor 564, such as control circuits 575 and CPU/Control Unit 578. Instructions can then be sent to print controller 214 based on the IR information, as described at length above.

FIG. 6 represents one example for receiving IR radiation, selecting specific wavelengths of IR radiation, and converting the IR radiation to electrical signals to ultimately determine IR information that can be used to control aspects of the PBF system. The components in FIG. 6 are not necessarily drawn to scale, and other orientations of the components, with additional components to process the IR radiation from the diffraction grating 614, are possible.

It should also be understood that, while the sensors of FIGS. 2, 5 and 6 have been described in various embodiments to include specific components for determining IR information, other embodiments of the sensor may be equally suitable. Thus, the sensor should not be deemed as limited to the components described above.

FIGS. 7A-D illustrate exemplary embodiments of a radiation collector coupled to an occlusion member for selectively receiving IR radiation. FIG. 7A illustrates a basic orientation and printer/optical elements. For instance, an occlusion member and IR transparent film configuration 707A are collectively positioned above the build plate 701 so that measurements can be taken from the powder bed surface of the EB-PBF printer. Radiation collector 713A is connected to the occlusion member 707A, and the radiation collector may include a lens or a more complex configuration of IR transparent and sacrificial elements.

FIG. 7B shows an exemplary embodiment of the radiation collector 713B coupled to occlusion member 707B. Radiation collector 713B includes a lens 729 for concentrating IR radiation received from the powder bed surface onto another element, such as a portion of an optical fiber. Radiation collector 713B further includes an IR transparent film 736 for selectively receiving IR wavelengths. Radiation collector 713B can be coupled to an occlusion member 707B, in which the film 736 and at least a portion of radiation collector 713B can be housed or otherwise supported. Transparent film 736 starts out as a clean, unexposed film section 719 underneath the left side of the occlusion member 707B. Clean film section 719 is masked from exposure to radiation by occlusion member 707B. Meanwhile, a section of film 736 currently aligned with an optical receive pathway of radiation collector 713B may be used to receive IR radiation.

The structure of FIG. 7B is operative to avoid the buildup of excessive condensation on any given section of film 736. Thus, whether periodically in a predetermined time interval, or dynamically at a processor-controlled rate, the circuits of the occlusion member 707B advance another section of the film 736 into alignment with the radiation collector 713B to expose a new region of the IR transparent film 736. Stated differently, the occlusion member 707B and/or related circuitry feeds the film in a direction to the right to expose a new section. The current IR transparent film section under lens 713B is, as a result, advanced into a masked position on the right of the apparatus at a right side of occlusion member 707B, wherein it can be designated "dirty film" 725. In some embodiments, the dirty film 725 can subsequently be cleaned from any condensation or other contaminants to which it was exposed while being used. Then, after another predetermined time interval or as governed by processor instructions, the occlusion member 707B again advances the film 736 to move a new, previously unexposed section from the left part of the occlusion member 707B into alignment with the radiation collector. This process can be repeated as long as there is film 736 remaining in the apparatus. The process of advancing the film can repeat in this manner during a print job to maximize accuracy of the received IR radiation, thus increasing the robustness and precision of temperature control during the print.

The apparatus of FIG. 7B advantageously maximizes the accuracy of IR spectral readings by using a given section of film over the lens for a period of time after which a new section is provided. The processor can also cause the occlusion member 707B to speed up the advancement of the film sections, for example, at higher risk areas such as when the radiation collector is receiving radiation during the print cycle, or the radiation collector is immediately above the surface being scanned, or for other reasons. Meanwhile, during a re-coat cycle, for instance, the processor may opt to slow the advance of film 736 to preserve the duration of the film, with minimal risks of condensation of particles.

In various embodiments, the IR transparent film can be formed as a "cartridge" similar to a toner cartridge. The cartridge can be inserted into the occlusion member 707B for easy replacement when the film in the existing cartridge is used. Alternatively, the occlusion member or radiation collector may be part of the replacement cartridge itself.

FIG. 7C represents another embodiment of the radiation collector 713C. Here, the occlusion member includes a shutter that can have two positions: shutter open 701 (top view) and shutter closed (703). In the shutter open 701 configuration, radiation collector 713C may use its lens or IR transparent materials to sense the received radiation. Periodically, or selectively in responsive to processor instructions, the shutter open 701 configuration can revert to "shutter closed" 703. In this manner, the lens can be protected from undue condensation or other damage that may result due to the atomic and molecular particles that may be on the fly in the vacuum chamber. Advantageously, the shutter can be quickly closed to prevent more energetic conditions from damaging the lens. In various embodiments, the processor uses an algorithm to maintain a shutter closed 703 configuration more often during the print cycle, and less often (if at all) during the re-coat cycle.

Referring now to FIG. 7D, the occlusion member 707D can encase the radiation collector 713D in a rotary structure. Radiation collector 713D can have a plurality of lenses 729 (four are shown for illustrative purposes, although a larger or smaller number is possible), each of which can include a separate lens or associated section of IR transparent material. In FIG. 7D, four exemplary lenses 729 progressively rotate. In some embodiments, the lenses themselves can constitute the transparent material sections. In other embodiments, independent sections of IR transparent material and/or other sacrificial or transparent elements may be stacked over one another within the radiation collector 713D.

Occlusion member 707D may rotate (e.g. under control of a processor or dedicated optical circuit) to expose a new section of previously masked material on the left middle side of the apparatus. As before, the period of rotation may be regular or it may depend on different factors such as whether the cycle is a re-coat cycle or print cycle, where the measurements are being performed, the speed and intensity of a print cycle, the positioning of the electron beam source, the likelihood of condensation as measured in previous cycles, and so on.

Other embodiments may include automated cleaning of condensed portions of the materials, or the insertion of new sections. These embodiments may be relevant to the operation of the rotary window or the other configurations of FIGS. 7A-D. In an exemplary embodiment, the occlusion member 707D uses a wheel assembly 728 for the rotary window that can easily be removed between printing runs and the lenses and materials cleared of condensation before replacing the apparatus for the next print job.

FIG. 7D also shows exemplary side views of radiation collector 713D as well as a cross-sectional view of the occlusion member 707D sandwiching its wheel apparatus in between the outer cover 767. Small ball bearings, lubricants, or other friction-reducing methods may be used between the wheel 765 and outer cover 767 to enable smooth movement of the wheel.

Various embodiments of the radiation collector itself may be used. FIG. 8A shows a front view of a radiation collector 848A including a single lens 829 for receiving radiation. The lens can concentrate the light onto an optical fiber, and a wavelength division multiplexor can obtain IR wavelengths. With this information, the processor can determine any number of parameters in the IR wavelengths, including a temperature, a temperature profile (which can be measured over time, powder bed area, or other considerations), or information regarding IR energies and their effect on the build plate, etc. Relevant information can be sent to the print controller (or another controller or processor) so that different parameters can be adjusted on the fly or during the next cycle. Such parameters noted above include electron beam intensity, scanning rate, cycle time, the need for waiting periods between or within scans, and other information. In FIG. 8A, the occlusion member 807A is operative to move in the direction of an x axis, for example, for simplicity to cover lens 829 as necessary.

While the radiation collectors described herein are often illustrated as having one or two layers, in other embodiments the radiation collector 848B may use more complex configurations without departing from the spirit and scope of the disclosure. For example, referring to FIG. 8B, radiation collector 848B can use a plurality of stacked elements and multiple lenses to receive IR radiation. IR transparent layer 888 may be used to broadly admit IR wavelengths. To improve the accuracy of the radiation collector and reject non-IR wavelengths, a sacrificial layer 886 may be stacked underneath the transparent layer 888. The sacrificial layer 886 can "fine tune" the IR transparent layer by rejecting additional non-IR wavelengths. A glass layer 884, such as leaded glass or another sturdy optical element may be stacked adjacent the sacrificial layer 886. Other layers may be used, such as a separate lens that is optimized for focusing the received radiation onto a designated focal point or a diffraction grating.

Figure 9:
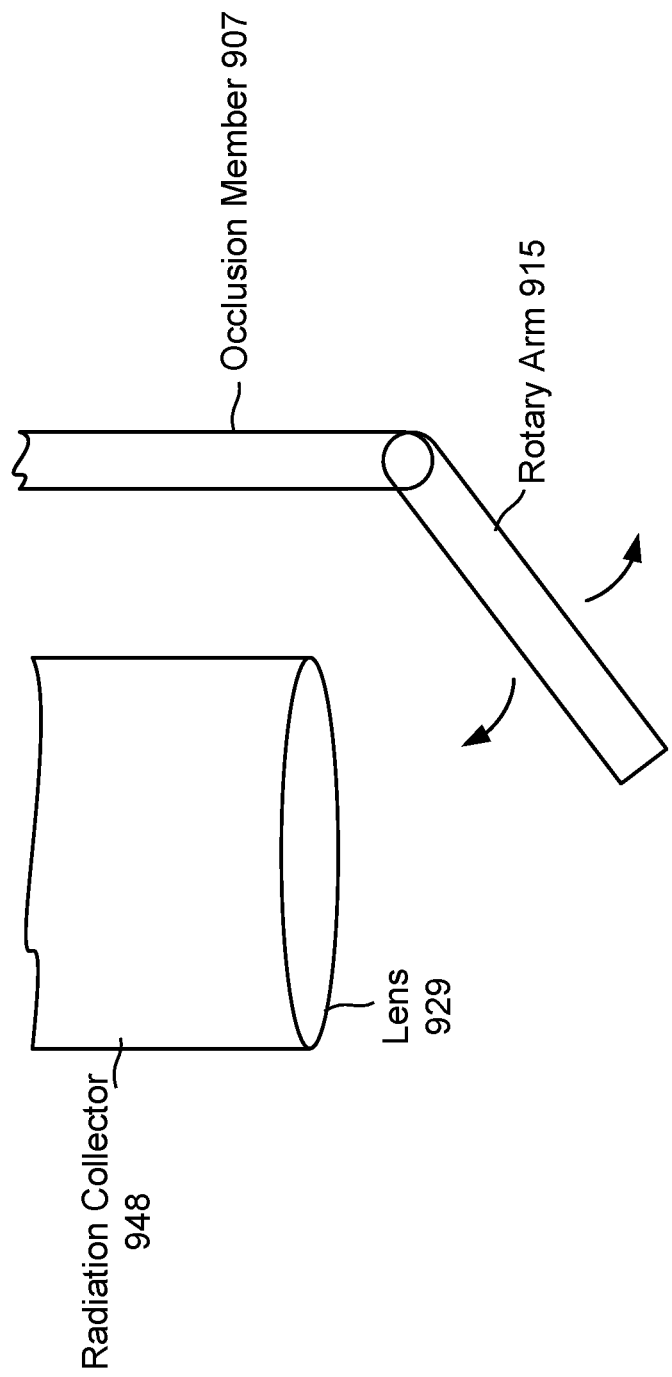
FIG. 9 illustrates views of another exemplary configuration of the lens and occlusion member in accordance with different embodiments.

FIG. 9 illustrates views of another exemplary configuration of the lens 929 and occlusion member 907 in accordance with different embodiments. Radiation collector 948 including lens 929 are similar to previous embodiments. In this exemplary embodiment, occlusion member 907 includes a rotary arm 915 designed to rotate upward or downward to expose or mask the lens, respectively, when appropriate. In some embodiments, the rotary arm 915 can be configured to move more than ninety (90) degrees away from radiation collector 948 (i.e., toward the right in FIG. 9) to enable it to swing backwards to provide the radiation collector 948 a wider field of view.

Figure 10:
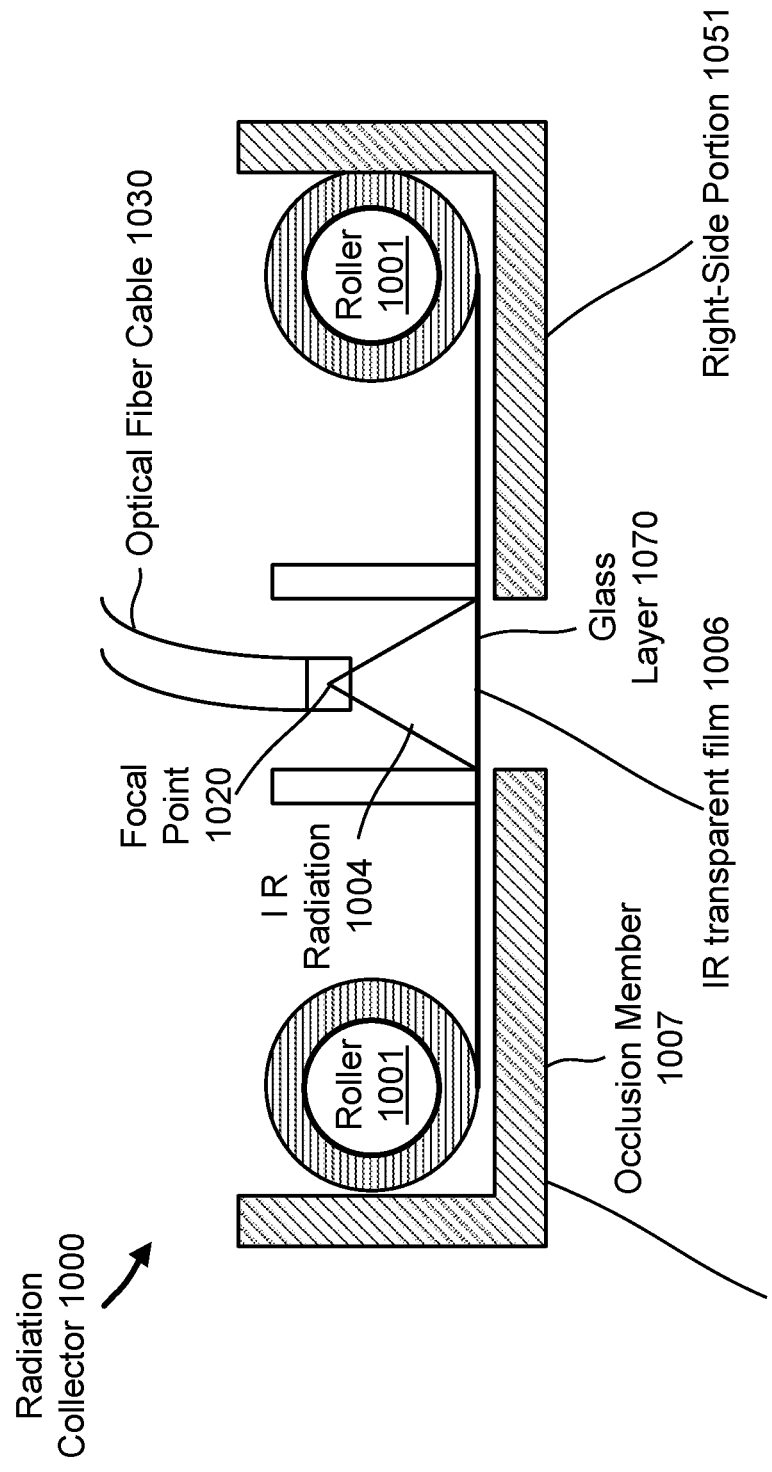
FIG. 10 illustrates a view of an embodiment of the occlusion member and radiation collector using rollers.

FIG. 10 illustrates a view of an embodiment of the occlusion member 1007 and radiation collector 1000 using rollers. This embodiment uses concepts articulated above with reference to FIG. 7B, and represents one technique for progressively advancing new sections of film to align with the input of the radiation collector 1000. For example, the input of radiation collector 1048 can be configured in the center of the apparatus, with occlusion member 1007 including one left-side portion 1049 for masking new IR-transparent film 1006, and another right-side portion 1051 for masking used IR-transparent film. In various embodiments, the right-side portion 1051 of occlusion member 1007 is not used. To enable streamlined use of a continuous supply of IR transparent film 1006, the film is selected to be flexible such that it can be rolled without damage. Two rollers 1001 are used to progressively feed, under processor control, the film so that periodically, new sections are exposed to align with the input of the radiation collector. A glass layer 1070 or lens may protect the remaining portions of the radiation collector in some embodiments. The lens may also concentrate the IR radiation 1004 on the focal point 1020 of an optical fiber cable 1030. In other configurations, only one roller is used.

The previous description is provided to enable any person skilled in the art to practice the various aspects described herein. Various modifications to these exemplary embodiments presented throughout this disclosure will be readily apparent to those skilled in the art. Thus, the claims are not intended to be limited to the exemplary embodiments presented throughout the disclosure, but are to be accorded the full scope consistent with the language claims. All structural and functional equivalents to the elements of the exemplary embodiments described throughout this disclosure that are known or later come to be known to those of ordinary skill in the art are intended to be encompassed by the claims.

Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. An apparatus for a powder bed fusion printer, comprising:
    a radiation collector that receives infrared (IR) radiation from a powder bed surface;
    a sensor that determines IR information of the powder bed surface based on the received IR radiation;
    an occlusion member that selectively masks or exposes the radiation collector or regions thereof; and
    a control circuit configured to control the occlusion member to mask the sensor between periods when the IR information is received.

2. The apparatus of claim 1, wherein the radiation collector includes a lens.

3. The apparatus of claim 1, wherein the IR information includes at least a temperature, a temperature profile, temperature information, or an IR spectrum.

4. The apparatus of claim 1, further comprising a controller configured to modify, based at least in part on the IR information, an intensity of an electron beam generated by the printer.

5. The apparatus of claim 1, wherein the radiation collector receives the IR information at different regions of the powder bed surface.

6. The apparatus of claim 1, wherein the occlusion member comprises a shutter to mask the radiation collector during at least a portion of a print cycle and to expose the radiation collector during at least a portion of a re-coat cycle to receive the IR radiation.

7. The apparatus of claim 1, wherein the radiation collector comprises a material that is selectively transparent to one or more IR wavelength ranges and is configured to reject one or more non-IR wavelength ranges.

8. The apparatus of claim 1, wherein
    the radiation collector comprises a plurality of sections of IR transparent material,
    during a first stage of operation, the occlusion member exposes a first section to receive the IR radiation while masking unexposed sections, and
    during each subsequent stage of operation, the occlusion member exposes a different one of the sections to receive the IR radiation.

9. The apparatus of claim 8, wherein the occlusion member comprises a rotary window configured to rotate to expose at least one of the sections to receive the IR radiation.

10. The apparatus of claim 8, wherein
    the IR transparent material comprises a film, and
    the occlusion member is configured to progressively advance the IR transparent film into alignment with the radiation collector to expose a new region of the IR transparent film to receive the IR radiation while masking unexposed regions of the IR transparent film.

11. The apparatus of claim 1, further comprising an IR optical fiber cable configured to carry the received IR radiation to the sensor.

12. A powder bed fusion apparatus, comprising:
    an electron beam source that selectively fuses layers of powder on a powder bed;

a radiation collector that receives infrared (IR) radiation from a surface of the powder bed, wherein the radiation collector comprises IR transparent material;

a sensor that determines IR information of the powder bed based on the IR radiation; and an occlusion member that selectively exposes or masks at least a portion of the radiation collector, wherein the occlusion member comprises an aperture aligned with an optical receive pathway of the radiation collector and the occlusion member is configured to periodically advance unexposed sections of the IR transparent material into alignment with the aperture to receive the IR radiation.

13. The apparatus of claim 12, wherein the radiation collector includes a lens.

14. The apparatus of claim 13, wherein the lens and the occlusion member are positioned in a vacuum chamber of the powder bed fusion apparatus above the powder bed.

15. The apparatus of claim 14, further comprising an IR fiber cable configured to carry the received IR radiation out of the vacuum chamber via a feed-through interface to the sensor.

16. The apparatus of claim 12, wherein the IR information includes at least a temperature, a temperature profile, temperature information, or an IR spectrum.

17. The apparatus of claim 16, further comprising a controller configured to modify, based at least in part on the determined temperature, temperature profile or temperature information, an intensity of an electron beam generated by the electron beam source.

18. The apparatus of claim 17, wherein
the controller is configured to receive from the sensor the IR information during a print cycle, and is configured to dynamically modify the intensity of the electron beam during the same print cycle.

19. The apparatus of claim 17, wherein the controller is configured to increase an intensity of the electron beam to prevent under-heating of the powder bed, and to decrease the intensity of the electron beam to prevent over-heating of the powder bed.

20. The apparatus of claim 12, wherein the occlusion member comprises a shutter configured to cause the occlusion member to selectively mask part or all of the radiation collector and to protect the radiation collector from condensation caused at least in part by vapor from vaporized powder created during a print cycle.

21. The apparatus of claim 12, wherein the occlusion member is configured to mask the radiation collector during a print cycle and to expose the radiation collector to receive the IR radiation during a re-coat cycle following the print cycle.

22. An apparatus for a powder bed fusion printer, comprising:

a radiation collector that receives infrared (IR) radiation from a powder bed surface, wherein the radiation collector comprises a material that is selectively transparent to one or more IR wavelength ranges and is configured to reject one or more non-IR wavelength ranges;

a sensor that determines IR information of the powder bed surface based on the received IR radiation; and an occlusion member that selectively masks or exposes the radiation collector or regions thereof.

23. The apparatus of claim 22, wherein the radiation collector includes a lens.

24. The apparatus of claim 22, wherein the IR information includes at least a temperature, a temperature profile, temperature information, or an IR spectrum.

25. The apparatus of claim 22, further comprising a controller configured to modify, based at least in part on the IR information, an intensity of an electron beam generated by the printer.

26. The apparatus of claim 22, wherein the radiation collector receives the IR information at different regions of the powder bed surface.

27. The apparatus of claim 22, further comprising a control circuit configured to control the occlusion member to mask the sensor between periods when the IR information is received.

28. The apparatus of claim 22, wherein the occlusion member comprises a shutter to mask the radiation collector during at least a portion of a print cycle and to expose the radiation collector during at least a portion of a re-coat cycle to receive the IR radiation.

29. The apparatus of claim 22, wherein
the radiation collector comprises a plurality of sections of IR transparent material,
during a first stage of operation, the occlusion member exposes a first section to receive the IR radiation while masking unexposed sections, and
during each subsequent stage of operation, the occlusion member exposes a different one of the sections to receive the IR radiation.

30. The apparatus of claim 29, wherein the occlusion member comprises a rotary window configured to rotate to expose at least one of the sections to receive the IR radiation.

31. The apparatus of claim 29, wherein
the IR transparent material comprises a film, and
the occlusion member is configured to progressively advance the IR transparent film into alignment with the radiation collector to expose a new region of the IR transparent film to receive the IR radiation while masking unexposed regions of the IR transparent film.

32. The apparatus of claim 22, further comprising an IR optical fiber cable configured to carry the received IR radiation to the sensor.

* * * * *